US010104385B2

(12) United States Patent
Li et al.

(10) Patent No.: US 10,104,385 B2
(45) Date of Patent: Oct. 16, 2018

(54) SIGNALING REFERENCE LAYERS FOR 3D COLOR PREDICTION FOR COLOR GAMUT SCALABILITY

(71) Applicant: QUALCOMM Incorporated, San Diego, CA (US)

(72) Inventors: Xiang Li, San Diego, CA (US); Jianle Chen, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 408 days.

(21) Appl. No.: 14/688,700

(22) Filed: Apr. 16, 2015

(65) Prior Publication Data

US 2015/0304664 A1 Oct. 22, 2015

Related U.S. Application Data

(60) Provisional application No. 61/981,125, filed on Apr. 17, 2014, provisional application No. 62/005,651, filed on May 30, 2014.

(51) Int. Cl.
*H04N 7/12* (2006.01)
*H04N 19/186* (2014.01)
*H04N 13/161* (2018.01)
*H04N 19/44* (2014.01)
*H04N 19/503* (2014.01)
(Continued)

(52) U.S. Cl.
CPC ....... *H04N 19/186* (2014.11); *H04N 13/0048* (2013.01); *H04N 13/161* (2018.05); *H04N 19/105* (2014.11); *H04N 19/30* (2014.11); *H04N 19/36* (2014.11); *H04N 19/42* (2014.11);
(Continued)

(58) Field of Classification Search
None
See application file for complete search history.

(56) References Cited

U.S. PATENT DOCUMENTS

2013/0177066 A1  7/2013  Ye et al.
2014/0140414 A1* 5/2014  Deshpande .......... H04N 19/597
                                                       375/240.25
(Continued)

OTHER PUBLICATIONS

Non-Final Office Action from U.S. Appl. No. 14/688,648 dated May 11, 2017 (15 pages).
(Continued)

*Primary Examiner* — Dakshesh D Parikh
(74) *Attorney, Agent, or Firm* — Shumaker & Sieffert, P.A.

(57) ABSTRACT

Techniques are described for performing constrained three-dimensional (3D) color prediction for color gamut scalability in video coding. Color prediction techniques for color gamut scalability may be used by video coders to generate inter-layer reference pictures when a color gamut for a reference layer of video data is different than a color gamut for an enhancement layer of the video data, or when a bit depth of the reference layer is different than a bit depth of the enhancement layer. According to the techniques, a video coder may perform 3D color prediction with constrained bit depths of input and output color components of the 3D lookup table. According to further techniques, in the case of multiple layers, a video coder may perform 3D color prediction with constrained application to reference pictures in only one or more identified reference layers.

26 Claims, 16 Drawing Sheets

(51) Int. Cl.
*H04N 19/597* (2014.01)
*H04N 13/00* (2018.01)
*H04N 19/105* (2014.01)
*H04N 19/30* (2014.01)
*H04N 19/42* (2014.01)
*H04N 19/36* (2014.01)

(52) U.S. Cl.
CPC ........... *H04N 19/44* (2014.11); *H04N 19/503* (2014.11); *H04N 19/597* (2014.11)

(56) References Cited

U.S. PATENT DOCUMENTS

| | | | |
|---|---|---|---|
| 2015/0103902 A1 | 4/2015 | Li et al. | |
| 2015/0172616 A1* | 6/2015 | Ye | H04N 1/64 348/43 |
| 2015/0172670 A1 | 6/2015 | Li et al. | |
| 2015/0229934 A1 | 8/2015 | Li et al. | |
| 2015/0304628 A1 | 10/2015 | Li et al. | |
| 2016/0057454 A1* | 2/2016 | Bordes | H04N 19/50 375/240.12 |

OTHER PUBLICATIONS

Wiegand et al., "WD1: Working Draft 1 of High-Efficiency Video Coding", JCTVC-C403, 3rd Meeting: Guangzhou, CN, Oct. 7-15, 2010, (Joint Collaborative Team on Video Coding of ISO/IEC JTC1/SC29/WG11 and ITU-T SG.16); Jan. 6, 2011, 137 pp.
Wiegand et al., "WD2: Working Draft 2 of High-Efficiency Video Coding," JCTVC-D503, 4th Meeting: Daegu, KR, Jan. 20-28, 2011, (Joint Collaborative Team on Video Coding of ISO/IEC JTC1/SC29/WG11 and ITU-T SG.16); Apr. 15, 2011, 153 pp.
Wiegand et al., "WD3: Working Draft 3 of High-Efficiency Video Coding," Document JCTVC-E603, 5th Meeting: Geneva, CH, Mar. 16-23, 2011,(Joint Collaborative Team on Video Coding of ISO/IEC JTC1/SC29/WG11 and ITU-T SG.16); May 9, 2015, 193 pp.
Bross et al., "WD4: Working Draft 4 of High-Efficiency Video Coding," 6th Meeting: Torino, IT, Jul. 14-22, 2011, (Joint Collaborative Team on Video Coding of ISO/IEC JTC1/SC29/WG11 and ITU-T SG.16);JCTVC-F803_d2, Oct. 4, 2011, 226 pp.
Bross et al., "WD5: Working Draft 5 of High-Efficiency Video Coding," 7th Meeting: Geneva, Switzerland, Nov. 21-30, 2011, (Joint Collaborative Team on Video Coding of ISO/IEC JTC1/SC29/WG11 and ITU-T SG.16);JCTVC-G1103_d2, Dec. 30, 2011, 214 pp.
Bross et al., "High efficiency video coding (HEVC) text specification draft 6," 8th Meeting: San Jose, CA, USA, Feb. 1-10, 2012, (Joint Collaborative Team on Video Coding of ISO/IEC JTC1/SC29/WG11 and ITU-T SG.16); JCTVC-H1003, Apr. 2, 2012, 259 pp.
Bross et al., "High efficiency video coding (HEVC) text specification draft 7," 9th Meeting: Geneva, CH, Apr. 27-May 7, 2012, (Joint Collaborative Team on Video Coding of ISO/IEC JTC1/SC29/WG11 and ITU-T SG.16); JCTVC-I1003_d2, Jun. 1, 2012, 290 pp.
Bross et al., "High efficiency video coding (HEVC) text specification draft 8," 10th Meeting: Stockholm, SE, Jul. 11-20, 2012, (Joint Collaborative Team on Video Coding of ISO/IEC JTC1/SC29/WG11 and ITU-T SG.16); JCTVC-J1003_d7, Jul. 28, 2012, 261 pp.
Bross et al., "High efficiency video coding (HEVC) text specification draft 9," 11th Meeting: Shanghai, CN, Oct. 10-19, 2012, (Joint Collaborative Team on Video Coding of ISO/IEC JTC1/SC29/WG11 and ITU-T SG.16); JCTVC-K1003_v7, Nov. 2, 2012, 290 pp.
Bross et al., "High efficiency video coding (HEVC) text specification draft 10 (for FDIS & Last Call)," 12th Meeting: Geneva, CH, Jan. 14-23, 2013, (Joint Collaborative Team on Video Coding of ISO/IEC JTC1/SC29/WG11 and ITU-T SG.16); JCTVC-L1003_v34, Mar. 19, 2013, 310 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.
ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.
Aminlou, et al., "SCE1: Color Gamut Scalability using Gain-offset Models," JCT-VC Meeting; Mar. 27-Apr. 4, 2014; Valencia; (Joint Collaborative Team on Video Coding of ISO/IEC JTC1/SC29/WG11 and ITU-T SG.16 ); URL: http://wftp3.itu.int/av-arch/jctvc-site/, No. JCTVC-Q0072, Mar. 17, 2014, XP030115971, 10 pp.
Bordes, et al., "AHG14: Color Gamut Scalable Video Coding using 3D LUT: New Results", JCT-VC Meeting; Jul. 25-Aug. 2, 2013; Vienna; (Joint Collaborative Team on Video Coding of ISO/IEC JTC1/SC29/WG11 and ITU-T SG.16); URL: http://wftp3.itu.int/av-arch/jctvc-site/,, No. JCTVC-N0168-v3, Jul. 24, 2013, XP030114646, 10 pp.
Bordes, et al., "SCE4: Results on 5.3-test1 and 5.3-test2," JCT-VC Meeting; Oct. 23-Nov. 1, 2013; Geneva; (Joint Collaborative Team on Video Coding of ISO/IEC JTC1/SC29/WG11 and ITU-T SG.16 ); URL: http://wftp3.itu.int/av-arch/jctvc-site/,, No. JCTVC-O0159-v3, Oct. 22, 2013, XP030115182, 12 pp.
Li, et al., "Non-SCE4: Weighted Prediction Based Color Gamut Scalability," JCT-VC Meeting; Oct. 23-Nov. 1, 2013; Geneva; (Joint Collaborative Team on Video Coding of ISO/IEC JTC1/SC29/WG11 and ITU-T SG.16 ); URL: http://wftp3.itu.int/av-arch/jctvc-site/,, No. JCTVC-O0180, Oct. 15, 2013, XP030115215, 5 pp.
Bordes, et al., "Color Gamut Scalable Video Coding for SHVC", 2013 Picture Coding Symposium (PCS), IEEE, Dec. 8, 2013, pp. 301-304, XP032567015, DOI: 10.1109/PCS.2013.6737743 [retrieved on Feb. 11, 2014].
Wang, et al., "High Efficiency Video Coding (HEVC) Defect Report," JCT-VC Meeting; Jul. 25-Aug. 2, 2013; (Joint Collaborative Team on Video Coding of ISO/IEC JTC1/SC29/WG11 and ITU-T SG.16 ); No. JCTVC-N1003_v1, Sep. 27, 2013; 311 pp.
Auyeung, et al., "Color gamut scalable video coding with piecewise linear predictions," JCT-VC Meeting; Jul. 29-Aug. 2, 2013; (Joint Collaborative Team on Video Coding of ISO/IEC JTC1/SC29/WG11 and ITU-T SG.16 ); No. JCTVC-N0271, Jul. 16, 2013; 3 pp.
Kerofsky, et al., "Color Gamut Scalable Video Coding: New Results," JCT-Meeting; Jan. 14-23, 2013; (Joint Collaborative Team on Video Coding of ISO/IEC JTC1/SC29/WG11 and ITU-T SG.16 ); No. JCTVC-L0334, Jan. 8, 2013; 17 pp.
Li, et al., "SCE1.2: Color gamut scalability with asymmetric 3D LUT," JCT-Meeting; Mar. 27-Apr. 4, 2014; (Joint Collaborative Team on Video Coding of ISO/IEC JTC1/SC29/WG11 and ITU-T SG.16 ); No. JCTVC-Q0048, Mar. 17, 2014; 11 pp.
Li, et al. "On CGS Signaling Improvements and Constraint," JCT-Meeting; Jun. 30-Jul. 9, 2014; (Joint Collaborative Team on Video Coding ISO/IEC JTC1/SC29/WG11 and ITU-T SG.16 ); No. JCTVC-R0150, Jun. 21, 2014, 3 pp.
Chen, et al., "High efficiency video coding (HEVC) scalable extension Draft 7," JCT-Meeting; Jun. 30-Jul. 9, 2014; (Joint Collaborative Team on Video Coding of ISO/IEC JTC1/SC29/WG11 and ITU-T SG.16 ); No. JCTVC-R1008_v7, Oct. 1, 2014; 175 pp.
Chen, et al., "High efficiency video coding (HEVC) scalable extension draft 3," JCT-Meeting; Jul. 25-Aug. 2, 2013; (Joint Collaborative Team on Video Coding of ISO/IEC JTC1/SC29/WG11 and ITU-T SG.16 ); No. JCTVC-N1008_v3, Sep. 16, 2013; 68 pp.
ITU-R Recommendation BT.2020-2, "Parameter values for UHDTV systems for production and international programme exchange," Oct. 2015, 8 pp.

(56) References Cited

OTHER PUBLICATIONS

ITU-R Recommendation BT.709-6, "Parameter values for the HDTV standards for production and international programme exchange," Jun. 2015, 19 pp.

Tech, et al., "MV-HEVC Draft Text 5," JCT-Meeting; Jul. 27-Aug. 2, 2013; (Joint Collaborative Team on Video Coding of ISO/IEC JTC1/SC29/WG11 and ITU-T SG.16 ); No. JCT3V-E1004_v6, Aug. 7, 2013; 65 pp.

Tech, et al., "3D-HEVC Draft Text 1," JCT Meeting; Jul. 27- Aug. 2, 2013; (Joint Collaborative Team on Video Coding of ISO/IEC JTC1/SC29/WG11 and ITU-T SG.16 ); No. JCT3V-E1001, Sep. 11, 2013, 89 pp.

International Search Report and Written Opinion from International Application No. PCT/US2015/026494, dated Jul. 17, 2015, 14 pp.

Response to Written Opinion dated Jul. 17, 2015, from International Application No. PCT/US2015/026494, filed on Feb. 4, 2016, 4 pp.

Second Written Opinion from International Application No. PCT/US2015/026494, dated Mar. 29, 2016, 9 pp.

Han, et al., "Improved Video Compression Efficiency Through Flexible Unit Representation and Corresponding Extension of Coding Tools", IEEE Transaction on Circuits and Systems for Video Technology, vol. 20, No. 12, pp. 1709-1720, Dec. 2010.

Sjoberg, et al., "Overview of HEVC High-Level Syntax and Reference Picture Management", IEEE Transaction on Circuits and Systems for Video Technology, vol. 22, No. 12, pp. 1858-1870, Dec. 2012.

Chen, et al., "SHVC Draft Text 1", Joint Collaborative Team on Video Coding (JCT-VC) of ITU-T SG16 WP3 and ISO/IEC JTC1/SC29/WG11, 12th Meeting: Geneva, CH, JCTVC-L1008, Jan. 14-23, 2013, 34 pp.

Chen, et al., "SHVC Test Model 1 (SHM 1)," 12. JCT-VC Meeting; MPEG Meeting; Jan. 14-23, 2013; Geneva; (Joint collaborative team on video coding of ISO/IEC JTC1/SC29/WG11 and ITU-T SG.16); URL: http://wftp3.itu.int/av-arch/jctvc-site/,, No. JCTVC-L1007, Feb. 15, 2013; XP030113952, 42 pp.

International Preliminary Report on Patentability from corresponding PCT Application Serial No. PCT/US2015/026494 dated Jun. 13, 2016 (10 pages).

Response to Office Action dated May 11, 2017, from U.S. Appl. No. 14/688,648, filed Aug. 10, 2017, 20 pp.

Final Office Action dated Sep. 14, 2017, from U.S. Appl. No. 14/688,648, 9 pp.

Response to Final Office Action dated Sep. 14, 2017, from U.S. Appl. No. 14/688,648, filed Nov. 2, 2017, 19 pp.

Advisory Action from U.S. Appl. No. 14/688,648 dated Nov. 15, 2017 (3 pages).

Non-Final Office Action from U.S. Appl. No. 14/688,648 dated Jan. 30, 2018 (9 pages).

Response to Non-Final Office Action from U.S. Appl. No. 14/688,648 dated Jan. 30, 2018, filed Apr. 9, 2018 (7 pages).

Final Office Action from U.S. Appl. No. 14/688,648 dated May 21, 2018 (12 pp).

Response to Final Office Action dated May 21, 2018 from U.S. Appl. No. 14/688,648, filed Jul. 13, 2018 (18 pp).

Advisory Action from U.S. Appl. No. 14/688,648 dated Aug. 2, 2018 (3 pp).

Response to Final Office Action dated May 21, 2018 and Advisory Action dated Aug. 2, 2018 from U.S. Appl. No. 14/688,648, filed Aug. 21, 2018 (6 pp).

\* cited by examiner

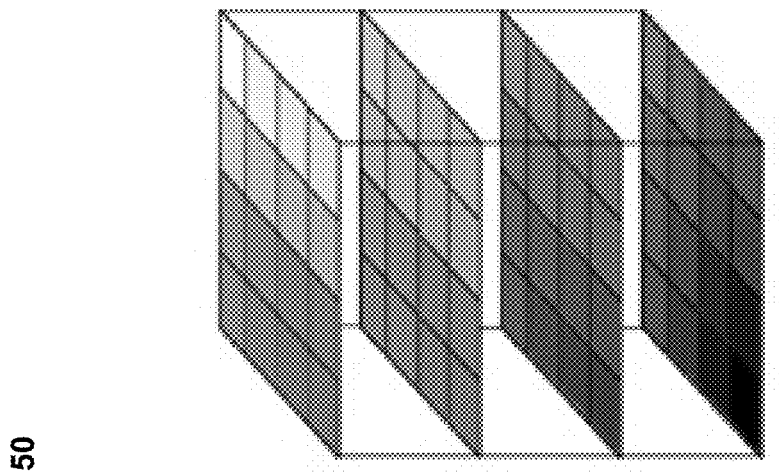
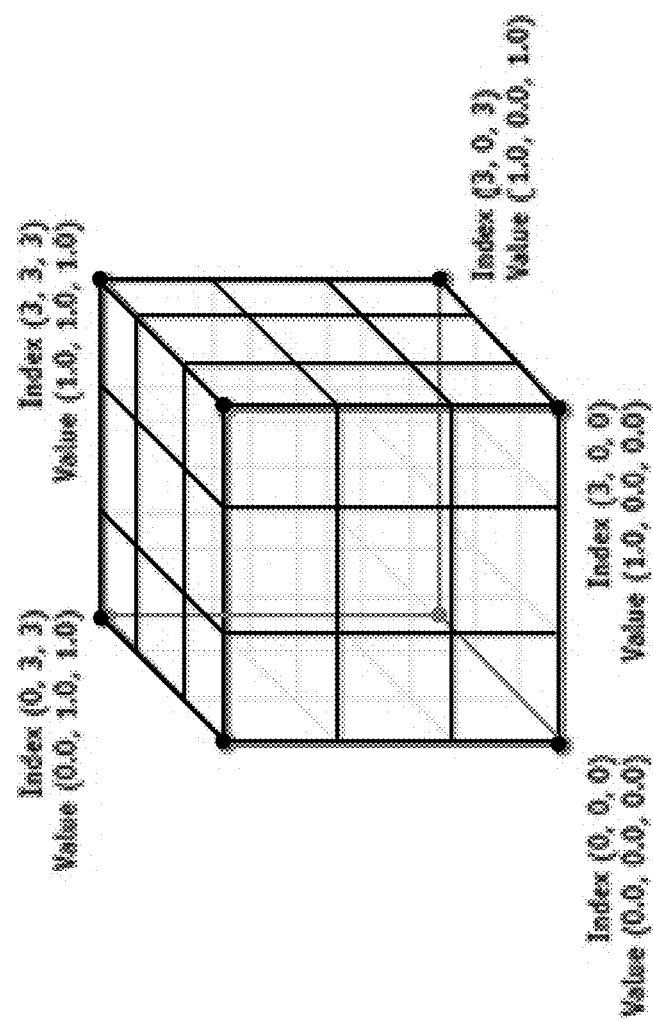
FIG. 11B
FIG. 11A

SIGNALING REFERENCE LAYERS FOR 3D COLOR PREDICTION FOR COLOR GAMUT SCALABILITY

This application claims the benefit of U.S. Provisional Application No. 61/981,125, filed Apr. 17, 2014, and U.S. Provisional Application No. 62/005,651, filed May 30, 2014, the contents of each of which are hereby incorporated by reference in their entirety.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10. Advanced Video Coding (AVC), the High Efficiency Video Coding (HEVC) standard presently under development, and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques for performing constrained three-dimensional (3D) color prediction for color gamut scalability in video coding. Color prediction techniques for color gamut scalability may be used by video encoders and/or video decoders to generate inter-layer reference pictures when a color gamut for a lower reference layer of video data is different than a color gamut for a higher enhancement layer of the video data. For example, a video encoder and/or video decoder may first perform color prediction using a 3D lookup table for color gamut scalability to convert the color data of a reference picture for the lower reference layer to the color gamut for the higher enhancement layer, and then generate inter-layer reference pictures based on the converted color data. The color prediction techniques may also be used by video encoders and/or video decoders to generate inter-layer reference pictures when a bit depth of a lower reference layer of video data is different than a bit depth of a higher enhancement layer of the video data.

According to the techniques described in this disclosure, a video encoder and/or video decoder may perform 3D color prediction with constrained bit depths of input and output color components of the 3D lookup table. According to further techniques described in this disclosure, in the case of multiple layers, a video encoder and/or video decoder may perform 3D color prediction with constrained application to reference pictures in only one or more identified reference layers.

In one example, this disclosure is directed to a method of decoding video data, the method comprising determining input bit depths of a 3D lookup table for color gamut scalability to be equal to bit depths of color components of a reference layer picture in a reference layer of the video data; applying the 3D lookup table to the color components of the reference layer picture to convert the color components from a first color gamut for the reference layer of the video data to a second color gamut for an enhancement layer of the video data; generating an inter-layer reference picture for an enhancement layer picture in the enhancement layer of the video data based on the converted color components; and decoding video blocks of the enhancement layer picture based on the inter-layer reference picture generated using the 3D lookup table.

In another example, this disclosure is directed to a method of encoding video data, the method comprising determining input bit depths of a 3D lookup table for color gamut scalability to be equal to bit depths of color components of a reference layer picture in a reference layer of the video data; applying the 3D lookup table to the color components of the reference layer picture to convert the color components from a first color gamut for the reference layer of the video data to a second color gamut for an enhancement layer of the video data; generating an inter-layer reference picture for an enhancement layer picture in the enhancement layer of the video data based on the converted color components; and encoding video blocks in the enhancement layer picture based on the inter-layer reference picture generated using the 3D lookup table.

In a further example, this disclosure is directed to a video decoding device comprising a memory configured to store video data, and one or more processors in communication with the memory. The one or more processors are configured to determine input bit depths of a 3D lookup table for color gamut scalability to be equal to bit depths of color components of a reference layer picture in a reference layer of the video data; apply the 3D lookup table to the color components of the reference layer picture to convert the color components from a first color gamut for the reference layer of the video data to a second color gamut for an enhancement layer of the video data; generate an inter-layer reference picture for an enhancement layer picture in the enhancement layer of the video data based on the converted color components; and decode video blocks of the enhancement layer picture based on the inter-layer reference picture generated using the 3D lookup table.

In an additional example, this disclosure is directed to a video encoding device comprising a memory configured to store video data, and one or more processors in communication with the memory. The one or more processors are configured to determine input bit depths of a 3D lookup table for color gamut scalability to be equal to bit depths of color components of a reference layer picture in a reference layer of the video data; apply the 3D lookup table to the color components of the reference layer picture to convert the color components from a first color gamut for the reference layer of the video data to a second color gamut for an enhancement layer of the video data; generate an inter-layer reference picture for an enhancement layer picture in the enhancement layer of the video data based on the converted color components; and encode video blocks in the enhancement layer picture based on the inter-layer reference picture generated using the 3D lookup table.

In another example, this disclosure is directed to a video decoding device comprising means for determining input bit depths of a 3D lookup table for color gamut scalability to be equal to bit depths of color components of a reference layer picture in a reference layer of the video data; means for applying the 3D lookup table to the color components of the reference layer picture to convert the color components from a first color gamut for the reference layer of the video data to a second color gamut for an enhancement layer of the video data; means for generating an inter-layer reference picture for an enhancement layer picture in the enhancement layer of the video data based on the converted color components; and means for decoding video blocks of the enhancement layer picture based on the inter-layer reference picture generated using the 3D lookup table.

In a further example, this disclosure is directed to a computer-readable storage medium storing instructions for decoding video data that, when executed, cause one or more processors to determine input bit depths of a 3D lookup table for color gamut scalability to be equal to bit depths of color components of a reference layer picture in a reference layer of the video data; apply the 3D lookup table to the color components of the reference layer picture to convert the color components from a first color gamut for the reference layer of the video data to a second color gamut for an enhancement layer of the video data; generate an inter-layer reference picture for an enhancement layer picture in the enhancement layer of the video data based on the converted color components; and decode video blocks of the enhancement layer picture based on the inter-layer reference picture generated using the 3D lookup table.

In one example, this disclosure is directed to a method of decoding video data, the method comprising receiving at least one reference layer identifier (ID) for a 3D lookup table for color gamut scalability, the at least one reference layer ID identifying at least one reference layer of a plurality of reference layers of the video data; applying the 3D lookup table to color components of a reference layer picture in the at least one reference layer identified by the at least one reference layer ID to convert the color components from a first color gamut for the reference layers of the video data to a second color gamut for an enhancement layer of the video data; generating an inter-layer reference picture for an enhancement layer picture in the enhancement layer of the video data based on the converted color components; and decoding video blocks of the enhancement layer picture based on the inter-layer reference picture generated using the 3D lookup table.

In another example, this disclosure is directed to a method of encoding video data, the method comprising determining at least one reference layer of a plurality of reference layers of the video data for a 3D lookup table for color gamut scalability; applying the 3D lookup table to color components of a reference layer picture in the at least one reference layer to convert the color components from a first color gamut for the reference layers of the video data to a second color gamut for an enhancement layer of the video data; generating an inter-layer reference picture for an enhancement layer picture in the enhancement layer of the video data based on the converted color components; encoding video blocks of the enhancement layer picture based on the inter-layer reference picture generated using the 3D lookup table; and signaling at least one reference layer ID identifying the at least one reference layer.

In a further example, this disclosure is directed to a video decoding device comprising a memory configured to store video data, and one or more processors in communication with the memory. The one or more processors are configured to receive at least one reference layer ID for a 3D lookup table for color gamut scalability, the at least one reference layer ID identifying at least one reference layer of a plurality of reference layers of the video data; apply the 3D lookup table to color components of a reference layer picture in the at least one reference layer identified by the at least one reference layer ID to convert the color components from a first color gamut for the reference layers of the video data to a second color gamut for an enhancement layer of the video data; generate an inter-layer reference picture for an enhancement layer picture in the enhancement layer of the video data based on the converted color components; and decode video blocks of the enhancement layer picture based on the inter-layer reference picture generated using the 3D lookup table.

In an additional example, this disclosure is directed to a video encoding device comprising a memory configured to store video data, and one or more processors in communication with the memory. The one or more processors are configured to determine at least one reference layer of a plurality of reference layers of the video data for a 3D lookup table for color gamut scalability; apply the 3D lookup table to color components of a reference layer picture in the at least one reference layer to convert the color components from a first color gamut for the reference layers of the video data to a second color gamut for an enhancement layer of the video data; generate an inter-layer reference picture for an enhancement layer picture in the enhancement layer of the video data based on the convened color components; encode video blocks of the enhancement layer picture based on the inter-layer reference picture generated using the 3D lookup table; and signal at least one reference layer ID identifying the at least one reference layer.

In another example, this disclosure is directed to a video decoding device comprising means for receiving at least one reference layer ID for a 3D lookup table for color gamut scalability, the at least one reference layer ID identifying at least one reference layer of a plurality of reference layers of the video data; means for applying the 3D lookup table to color components of a reference layer picture in the at least one reference layer identified by the at least one reference layer ID to convert the color components from a first color gamut for the reference layers of the video data to a second color gamut for an enhancement layer of the video data; means for generating an inter-layer reference picture for an enhancement layer picture in the enhancement layer of the video data based on the converted color components; and means for decoding video blocks of the enhancement layer picture based on the inter-layer reference picture generated using the 3D lookup table.

In a further example, this disclosure is directed to a computer-readable storage medium storing instructions for decoding video data that, when executed, cause one or more processors to receive at least one reference layer ID for a 3D lookup table for color gamut scalability, the at least one reference layer ID identifying at least one reference layer of a plurality of reference layers of the video data; apply the 3D lookup table to color components of a reference layer picture in the at least one reference layer identified by the at least one reference layer ID to convert the color components from a first color gamut for the reference layers of the video data to a second color gamut for an enhancement layer of the video data; generate an inter-layer reference picture for an enhancement layer picture in the enhancement layer of the video data based on the converted color components; and decode video blocks of the enhancement layer picture based on the inter-layer reference picture generated using the 3D lookup table.

The details of one or more examples are set forth in the accompanying drawings and the description below. Other features, objects, and advantages will be apparent from the description and drawings, and from the claims.

BRIEF DESCRIPTION OF DRAWINGS

FIGS. 11A and 11B are conceptual illustrations showing different views of an example 3D lookup table for color gamut scalability.

DETAILED DESCRIPTION

Figure 1:
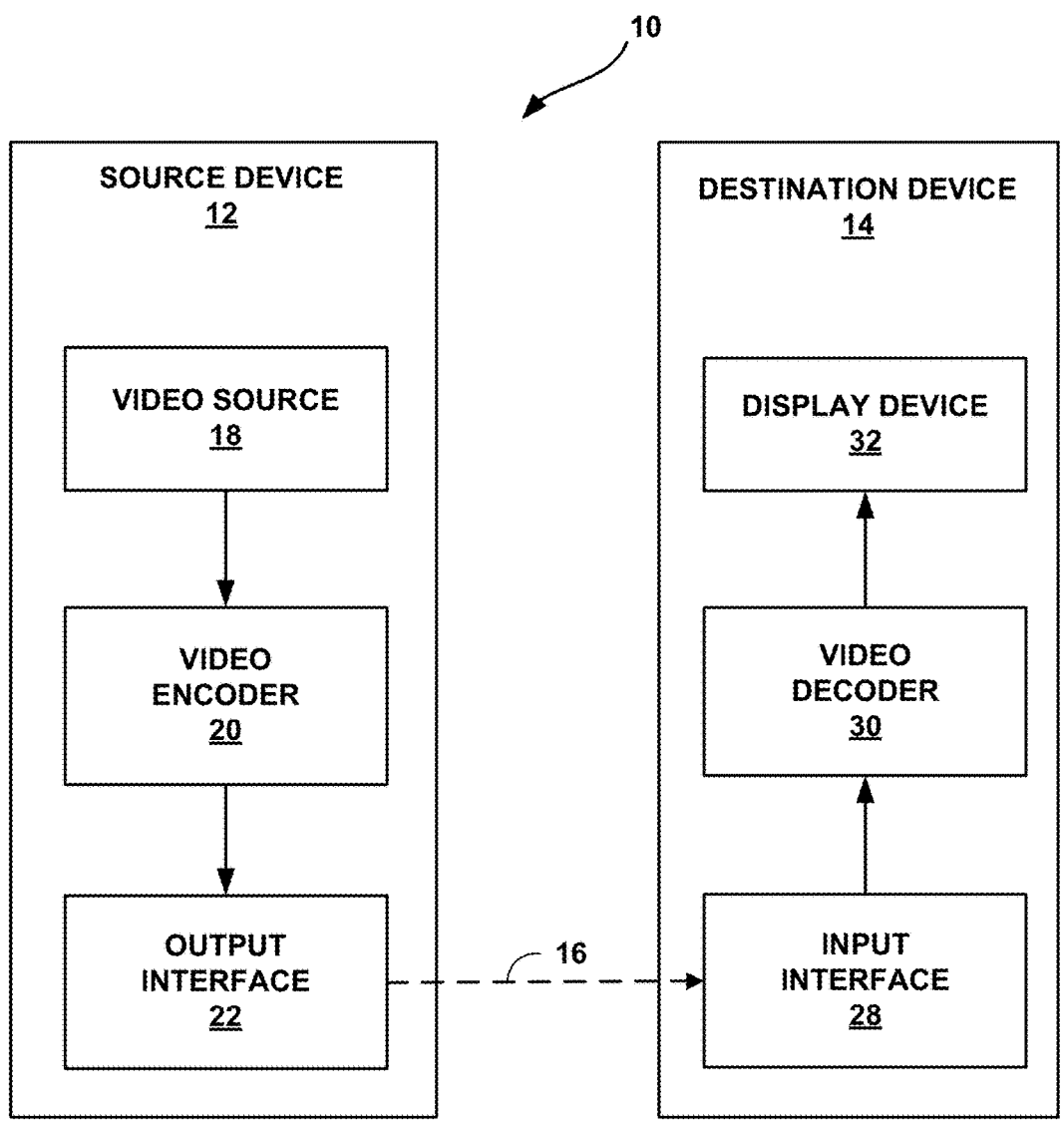
FIG. 1 is a block diagram illustrating an example video encoding and decoding system that may utilize techniques described in this disclosure.

Techniques of this disclosure relate to three-dimensional (3D) color prediction or mapping for color gamut scalability in video coding. The 3D color prediction techniques for color gamut scalability may be used by video encoders and/or video decoders to generate inter-layer reference pictures when a color gamut for a lower reference layer of video data is different than a color gamut for a higher enhancement layer of the video data. For example, a video encoder and/or video decoder may first perform color prediction using a 3D lookup table for color gamut scalability to convert the color data of a reference picture for the lower reference layer to the color gamut for the higher enhancement layer, and then generate inter-layer reference pictures based on the converted color data. The color prediction techniques may also be used by video encoders and/or video decoders to generate inter-layer reference pictures when a bit depth of a lower reference layer of video data is different than a bit depth of a higher enhancement layer of the video data.

A color gamut comprises a complete range of colors that can be reproduced for an image, e.g., in a picture, slice, block or layer of video data. Conventionally, in multi-layer video coding, a lower layer of video data (e.g., a base layer) and a higher layer of the video data (e.g., an enhancement layer) include color data in the same color gamut. e.g., high definition (HD) color gamut BT.709. In this case, a video encoder and/or video decoder may generate inter-layer reference pictures for the higher layer of the video data as up-sampled versions of co-located reference pictures for the lower layer of the video data.

In some examples, however, a lower layer of video data may include color data in a first color gamut, e.g., BT.709, and a higher layer of the video data may include color data in a different, second color gamut, e.g., ultra-high definition (UHD) color gamut BT.2020. In this example, in order to generate inter-layer reference pictures for the higher layer of the video data, a video encoder and/or video decoder must first perform color prediction to convert the color data of a reference picture in the first color gamut for the lower layer of the video data to the second color gamut for the higher layer of the video data.

The video encoder and/or video decoder may perform color prediction using a 3D lookup table for color gamut scalability. In some examples, a separate 3D lookup table may be generated for each of the color components, i.e., a luma (Y) component, a first chroma (U) component and a second chroma (V) component. Each of the 3D lookup tables includes a luma (Y) dimension, a first chroma (U) dimension and a second chroma (V) dimension, and is indexed using the three independent color components (Y, U, V).

According to the techniques described in this disclosure, a video encoder and/or video decoder may perform 3D color prediction with constrained bit depths of input and output color components of the 3D lookup table. For example, the bit depths of the input color components of the 3D lookup table may be constrained to be equal to a bit depth of a lower reference layer picture. As a further example, the bit depths of the output color components of the 3D lookup table may be constrained to be within a range between the bit depth of the lower reference layer picture and a bit depth of a higher enhancement layer picture, inclusively. In other words, the bit depths of the output color components of the 3D lookup table may be constrained to be within a range that is greater than or equal to the bit depth of the lower reference layer picture and less than or equal to a bit depth of a higher enhancement layer picture.

According to further techniques described in this disclosure, in the case of multiple layers, a video encoder and/or video decoder may perform 3D color prediction with constrained application to reference pictures in only one or more identified reference layers. For example, a video encoder may signal one or more reference layer identifiers (IDs) for each 3D lookup table to a video decoder, and the video decoder may only apply the 3D lookup table to reference layer pictures within the one or more identified reference layers. As another example, for each enhancement layer picture, the video encoder and/or the video decoder may be further constrained to only apply the 3D lookup table to reference layer pictures within a specified one of the reference layers.

The disclosed techniques may be used in the context of advanced video codecs, such as High Efficiency Video Coding (HEVC) codecs. Scalable video coding (SVC) techniques related to the techniques described in this disclosure are reviewed below with respect to FIGS. 4-6, followed by a discussion of the HEVC standard and related color gamut scalability techniques with respect to FIGS. 7-14.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-view Video Coding (MVC) extensions. In addition, High Efficiency Video Coding (HEVC) has been developed by the Joint Collaboration Team on Video Coding (JCT-VC) of ITU-T Video Coding Experts Group (VCEG) and ISO/IEC Motion Picture Experts Group (MPEG). The latest HEVC draft specification, referred to as HEVC WD. Wang et al., "High efficiency video coding (HEVC) Defect Report," Joint Collaborative Team on Video Coding (JCT-VC) of ITU-T SG16 WP3 and ISO/IEC JTC1/SC29/WG11, 14th Meeting: Vienna, AT, 25 Jul.-2 Aug. 2013, JCTVC-N1003v1, is available from http://phenix.int-evry.fr/jct/doc_end_user/documents/14_Vienna/wg11/JCTVC-N1003-v1.zip. The finalized HEVC standard document is published as ITU-T H.265, Series H: Audiovisual and Multimedia Systems, Infrastructure of audiovisual services—Coding of moving video, High efficiency video coding, Telecommunication Standardization Sector of International Telecommunication Union (ITU), April 2013.

The multi-view extension to HEVC (MV-HEVC) and another HEVC extension for more advanced 3D video coding (3D-HEVC) are being developed by the JCT-3V, and meanwhile, the scalable video coding extension to HEVC (SHVC) is being developed by the JCT-VC. A recent Working Draft (WD) of MV-HEVC, referred to as MV-HEVC WD5 hereinafter, is available from http://phenix.it-sudparis.eu/jct2/doc_end_user/documents/5_Vienna/wg11/JCT3V-E1004-v6.zip. A recent WD of 3D-HEVC, referred to as 3D-HEVC WD1 hereinafter, is available from http://phenix.it-sudparis.eu/jct2/doc_end_user/documents/5_Vienna/wg11/JCT3V-E1001-v3.zip. A recent Working Draft (WD) of SHVC, referred to as SHVC WD3 hereinafter, is available from http://phenix.it-sudparis.eu/jct/doc_end_user/documents/14_Vienna/wg11/JCTVC-N1008-v3.zip.

FIG. 1 is a block diagram illustrating an example video encoding and decoding system 10 that may utilize techniques described in this disclosure. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of source device 12 may be configured to apply the techniques for processing video data in parallel. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., groups of pictures (GOPs). Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

In the example of FIG. 1, video encoder 20 and video decoder 30 may operate according to the High Efficiency Video Coding (HEVC) standard developed by the Joint Collaboration Team on Video Coding (JCT-VC) of ITU-T Video Coding Experts Group (VCEG) and ISO/IEC Motion Picture Experts Group (MPEG). A latest HEVC draft specification is referred to as HEVC WD, cited above. The multi-view extension to HEVC (MV-HEVC) and another HEVC extension for more advanced 3D video coding (3D-HEVC) are being developed by the JCT-3V, and the scalable video coding extension to HEVC (SHVC) is being developed by the JCT-VC. The latest draft specification of MV-HEVC is referred to as MV-HEVC WD5, cited above. The latest draft specification of 3D-HEVC is referred to as 3D-HEVC WD1, cited above. A recent draft specification of SHVC is referred to as SHVC WD3, cited above.

In HEVC and other video coding standards, a video sequence typically includes a series of pictures. Pictures may also be referred to as "frames." A picture may include three sample arrays, denoted $S_L$, $S_{Cb}$, and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

Video encoder 20 may generate a set of coding tree units (CTUs). Each of the CTUs may comprise a coding tree block of luma samples, two corresponding coding tree blocks of chroma samples, and syntax structures used to code the samples of the coding tree blocks. In a monochrome picture or a picture that has three separate color planes, a CTU may comprise a single coding tree block and syntax structures used to code the samples of the coding tree block. A coding tree block may be an N×N block of samples. A CTU may also be referred to as a "tree block" or a "largest coding unit" (LCU). The CTUs of HEVC may be broadly analogous to the macroblocks of other video coding standards, such as H.264/AVC. However, a CTU is not necessarily limited to a particular size and may include one or more coding units (CUs). A slice may include an integer number of CTUs ordered consecutively in the raster scan.

This disclosure may use the term "video unit" or "video block" to refer to one or more blocks of samples and syntax structures used to code samples of the one or more blocks of samples. Example types of video units may include CTUs, CUs, PUs, transform units (TUs), macroblocks, macroblock partitions, and so on.

To generate a coded CTU, video encoder 20 may recursively perform quad-tree partitioning on the coding tree blocks of a CTU to divide the coding tree blocks into coding blocks, hence the name "coding tree units." A coding block is an N×N block of samples. A CU may comprise a coding block of luma samples and two corresponding coding blocks of chroma samples of a picture that has a luma sample array, a Cb sample array and a Cr sample array, and syntax structures used to code the samples of the coding blocks. In a monochrome picture or a picture that have three separate color planes, a CU may comprise a single coding block and syntax structures used to code the samples of the coding block.

Video encoder 20 may partition a coding block of a CU into one or more prediction blocks. A prediction block may be a rectangular (i.e., square or non-square) block of samples on which the same prediction is applied. A prediction unit (PU) of a CU may comprise a prediction block of luma samples, two corresponding prediction blocks of chroma samples of a picture, and syntax structures used to predict the prediction block samples. In a monochrome picture or a picture that have three separate color planes, a PU may comprise a single prediction block and syntax structures used to predict the prediction block samples. Video encoder 20 may generate predictive luma, Cb and Cr blocks for luma, Cb and Cr prediction blocks of each PU of the CU.

Video encoder 20 may use intra-prediction or inter-prediction to generate the predictive blocks for a PU. If video encoder 20 uses intra-prediction to generate the predictive blocks of a PU, video encoder 20 may generate the predictive blocks of the PU based on decoded samples of the picture associated with the PU.

If video encoder 20 uses inter-prediction to generate the predictive blocks of a PU, video encoder 20 may generate the predictive blocks of the PU based on decoded samples of one or more pictures other than the picture associated with the PU. Inter-prediction may be uni-directional inter-prediction (i.e., uni-prediction) or bi-directional inter-prediction (i.e., bi-prediction). To perform uni-prediction or bi-prediction, video encoder 20 may generate a first reference picture list (RefPicList0) and a second reference picture list (RefPicList1) for a current slice. Each of the reference picture lists may include one or more reference pictures. When using uni-prediction, video encoder 20 may search the reference pictures in either or both RefPicList0 and RefPicList1 to determine a reference location within a reference picture. Furthermore, when using uni-prediction, video encoder 20 may generate, based at least in part on samples corresponding to the reference location, the predictive sample blocks for the PU. Moreover, when using uni-prediction, video encoder 20 may generate a single motion vector that indicates a spatial displacement between a prediction block of the PU and the reference location. To indicate the spatial displacement between a prediction block of the PU and the reference location, a motion vector may include a horizontal component specifying a horizontal displacement between the prediction block of the PU and the reference location and may include a vertical component specifying a vertical displacement between the prediction block of the PU and the reference location.

When using bi-prediction to encode a PU, video encoder 20 may determine a first reference location in a reference picture in RefPicList0 and a second reference location in a reference picture in RefPicList1. Video encoder 20 may then generate, based at least in part on samples corresponding to the first and second reference locations, the predictive blocks for the PU. Moreover, when using bi-prediction to encode the PU, video encoder 20 may generate a first motion indicating a spatial displacement between a sample block of the PU and the first reference location and a second motion indicating a spatial displacement between the prediction block of the PU and the second reference location.

After video encoder 20 generates predictive luma, Cb, and Cr blocks for one or more PUs of a CU, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the luma, Cb and, Cr residual blocks of a CU into one or more luma, Cb, and Cr transform blocks. A transform block may be a rectangular block of samples on which the same transform is applied. A transform unit (TU) of a CU may comprise a transform block of luma samples, two corresponding transform blocks of chroma samples, and syntax structures used to transform the transform block samples. In a monochrome picture or a picture that has three separate color planes, a TU may comprise a single transform block and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. Furthermore, video encoder 20 may inverse quantize transform coefficients and apply an inverse transform to the transform coefficients in order to reconstruct transform blocks of TUs of CUs of a picture. Video encoder 20 may use the reconstructed transform blocks of TUs of a CU and the predictive blocks of PUs of the CU to reconstruct coding blocks of the CU. By reconstructing the coding blocks of each CU of a picture, video encoder 20 may reconstruct the picture. Video encoder 20 may store reconstructed pictures in a decoded picture buffer (DPB). Video encoder 20 may use reconstructed pictures in the DPB for inter-prediction and intra-prediction.

After video encoder 20 quantizes a coefficient block, video encoder 20 may entropy encode syntax elements that indicate the quantized transform coefficients. For example, video encoder 20 may perform Context-Adaptive Binary Arithmetic Coding (CABAC) on the syntax elements indicating the quantized transform coefficients. Video encoder 20 may output the entropy-encoded syntax elements in a bitstream.

Video encoder 20 may output a bitstream that includes a sequence of bits that forms a representation of coded pictures and associated data. The bitstream may comprise a sequence of network abstraction layer (NAL) units. Each of the NAL units includes a NAL unit header and encapsulates a raw byte sequence payload (RBSP). The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate a RBSP for a picture parameter set (PPS), a second type of NAL unit may encapsulate a RBSP for a coded slice, a third type of NAL unit may encapsulate a RBSP for Supplemental Enhancement Information (SEI), and so on. A PPS is a syntax structure that may contain syntax elements that apply to zero or more entire coded pictures. NAL units that encapsulate RBSPs for video coding data (as opposed to RBSPs for parameter sets and SEI messages) may be referred to as video coding layer (VCL) NAL units. A NAL unit that encapsulates a coded slice may be referred to herein as a coded slice NAL unit. A RBSP for a coded slice may include a slice header and slice data.

Video decoder 30 may receive a bitstream. In addition, video decoder 30 may parse the bitstream to decode syntax elements from the bitstream. Video decoder 30 may reconstruct the pictures of the video data based at least in part on the syntax elements decoded from the bitstream. The process to reconstruct the video data may be generally reciprocal to the process performed by video encoder 20. For instance, video decoder 30 may use motion vectors of PUs to determine predictive blocks for the PUs of a current CU. Video decoder 30 may use a motion vector or motion vectors of PUs to generate predictive blocks for the PUs.

In addition, video decoder 30 may inverse quantize coefficient blocks associated with TUs of the current CU. Video decoder 30 may perform inverse transforms on the coefficient blocks to reconstruct transform blocks associated with the TUs of the current CU. Video decoder 30 may reconstruct the coding blocks of the current CU by adding the samples of the predictive sample blocks for PUs of the current CU to corresponding samples of the transform blocks of the TUs of the current CU. By reconstructing the coding blocks for each CU of a picture, video decoder 30 may reconstruct the picture. Video decoder 30 may store decoded pictures in a decoded picture buffer for output and/or for use in decoding other pictures.

In MV-HEVC, 3D-HEVC and SHVC, a video encoder may generate a bitstream that comprises a series of network abstraction layer (NAL) units. Different NAL units of the bitstream may be associated with different layers of the bitstream. A layer may be defined as a set of video coding layer (VCL) NAL units and associated non-VCL NAL units that have the same layer identifier. A layer may be equivalent to a view in multi-view video coding. In multi-view video coding, a layer can contain all view components of the same layer with different time instances. Each view component may be a coded picture of the video scene belonging to a specific view at a specific time instance. In 3D video coding, a layer may contain either all coded depth pictures of a specific view or coded texture pictures of a specific view. Similarly, in the context of scalable video coding, a layer typically corresponds to coded pictures having video characteristics different from coded pictures in other layers. Such video characteristics typically include spatial resolution and quality level (Signal-to-Noise Ratio). In HEVC and its extensions, temporal scalability may be achieved within one layer by defining a group of pictures with a particular temporal level as a sub-layer.

For each respective layer of the bitstream, data in a lower layer may be decoded without reference to data in any higher layer. In scalable video coding, for example, data in a base layer may be decoded without reference to data in an enhancement layer. NAL units only encapsulate data of a single layer. In SHVC, a view may be referred to as a "base layer" if a video decoder can decode pictures in the view without reference to data of any other layer. The base layer may conform to the HEVC base specification. Thus, NAL units encapsulating data of the highest remaining layer of the bitstream may be removed from the bitstream without affecting the decodability of data in the remaining layers of the bitstream. In MV-HEVC, higher layers may include additional view components. In SHVC, higher layers may include signal to noise ratio (SNR) enhancement data, spatial enhancement data, and/or temporal enhancement data.

In some examples, data in a higher layer may be decoded with reference to data in one or more lower layers. The lower layers may be used as reference pictures to compress the higher layer using inter-layer prediction. The data of the lower layers may be up-sampled to have the same resolution as the higher layers. In general, video encoder 20 and video decoder 30 may perform inter-layer prediction in a similar manner as inter-prediction described above, except one or more up-sampled lower layers may be used as reference pictures as opposed to one or more neighboring pictures.

Figure 4:
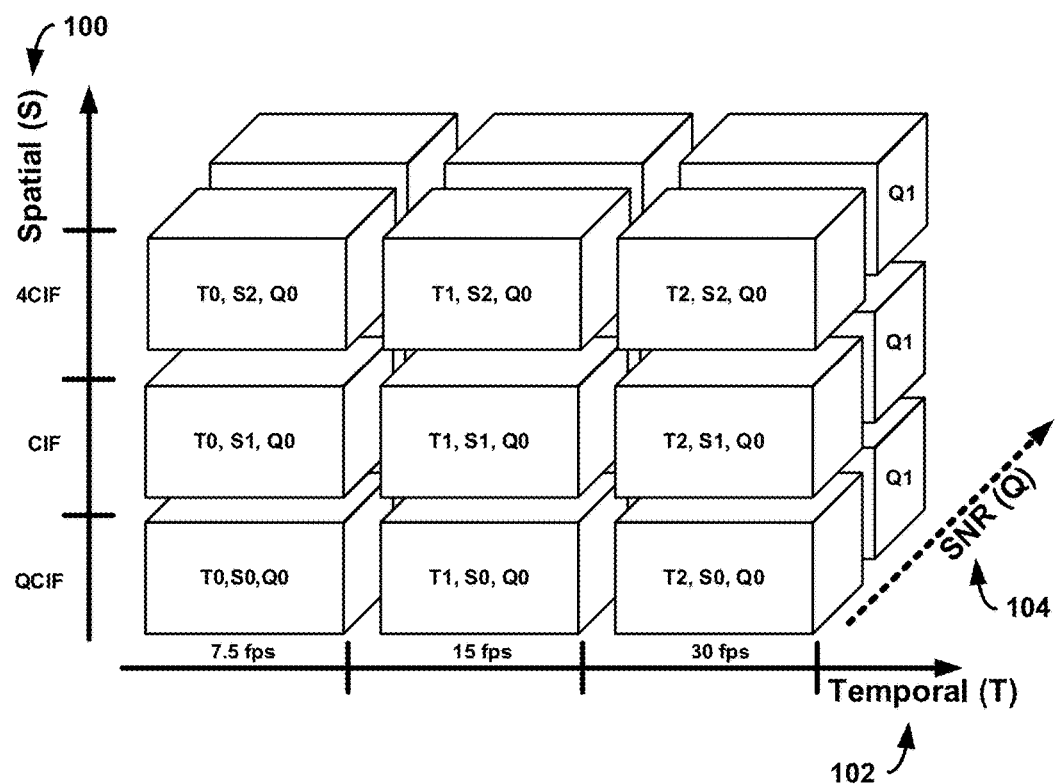
FIG. 4 is a conceptual illustration showing an example of scalability in three different dimensions.

FIG. 4 is a conceptual illustration showing an example of scalability in three different dimensions. In a scalable video coding structure, scalabilities are enabled in three dimensions. In the example of FIG. 4, the scalabilities are enabled in a spatial (S) dimension 100, a temporal (T) dimension 102, and a signal-to-noise ratio (SNR) or quality (Q) dimension 104. In the temporal dimension 102, frame rates with 7.5 Hz (T0), 15 Hz (T1) or 30 Hz (T2), for example, may be supported by temporal scalability. When spatial scalability is supported, different resolutions such as quarter common intermediate format (QCIF) (S0), common intermediate format (CIF) (S1) and 4CIF (S2), for example, are enabled in the spatial dimension 100. For each specific spatial resolution and frame rate, SNR layers (Q1) can be added in the SNR dimension 104 to improve the picture quality.

Once video content has been encoded in such a scalable way, an extractor tool may be used to adapt the actual delivered content according to application requirements, which are dependent e.g., on the clients or the transmission channel. In the example shown in FIG. 4, each cubic contains pictures with the same frame rate (temporal level), spatial resolution, and SNR layers. Better representation may be achieved by adding cubes (i.e., pictures) in any of dimensions 100, 102 or 104. Combined scalability is supported when there are two, three or even more scalabilities enabled.

In scalable video coding standards, such as the SVC extension to H.264 or SHVC, the pictures with the lowest spatial and SNR layer are compatible with the single layer video codec, and the pictures at the lowest temporal level form the temporal base layer, which may be enhanced with pictures at higher temporal levels. In addition to the base layer, several spatial and/or SNR enhancement layers may be added to provide spatial and/or quality scalabilities. Each spatial or SNR enhancement layer itself may be temporally scalable, with the same temporal scalability structure as the base layer. For one spatial or SNR enhancement layer, the lower layer it depends on may be referred as the base layer of that specific spatial or SNR enhancement layer.

Figure 5:
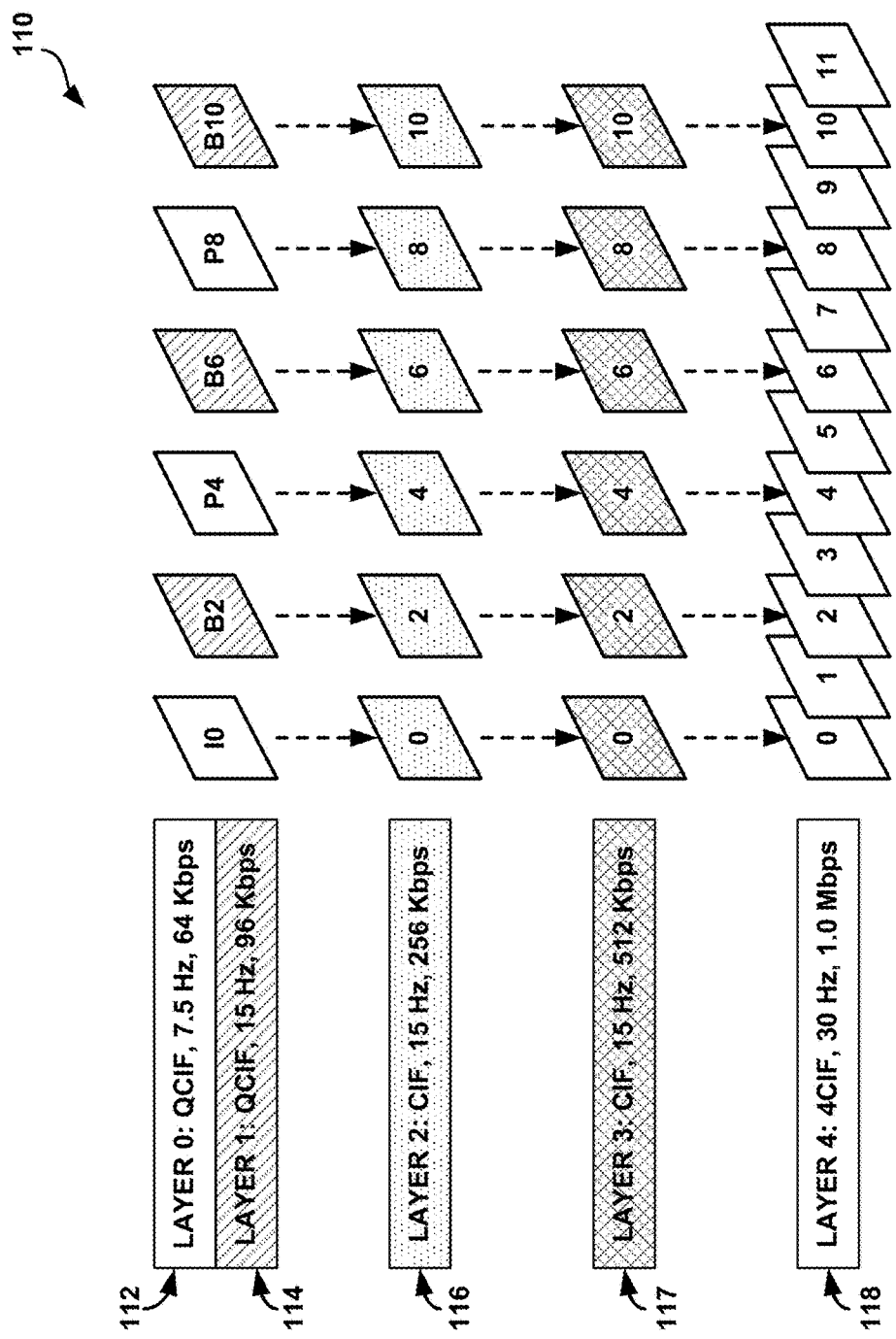
FIG. 5 is a conceptual illustration showing an example structure of a scalable video coding bitstream.

FIG. 5 is a conceptual illustration showing an example structure 110 of a scalable video coding bitstream. The bitstream structure 110 includes a layer 0 112 that includes pictures or slices I0, P4 and P8, and a layer 1 114 that includes pictures or slices B2, B6 and B10. In addition, bitstream structure 110 includes a layer 2 116 and a layer 3 117 that each includes pictures 0, 2, 4, 6, 8 and 10, and a layer 4 118 that includes pictures 0 through 11.

A base layer has the lowest spatial and quality layer (i.e., pictures in layer 0 112 and layer 1 114 with QCIF resolution). Among them, those pictures of the lowest temporal level form the temporal base layer, as shown in layer 0 112 of FIG. 5. The temporal base layer (layer 0) 112 can be enhanced with pictures of a higher temporal level, e.g., layer 1 114 with frame rate of 15 Hz or layer 4 118 with frame rate of 30 Hz.

In addition to the base layer 112, 114, several spatial and/or SNR enhancement layers may be added to provide spatial and/or quality scalabilities. For example, layer 2 116 with CIF resolution may be a spatial enhancement layer to base layer 112, 114. In another example, layer 3 117 may be an SNR enhancement layer to base layer 112, 114 and layer 2 116. As shown in FIG. 5, each spatial or SNR enhancement layer itself may be temporally scalable, with the same temporal scalability structure as the base layer 112, 114. In addition, an enhancement layer may enhance one or both of spatial resolution and frame rate. For example, layer 4 118 provides a 4CIF resolution enhancement layer, which further increases the frame rate from 15 Hz to 30 Hz.

Figure 6:
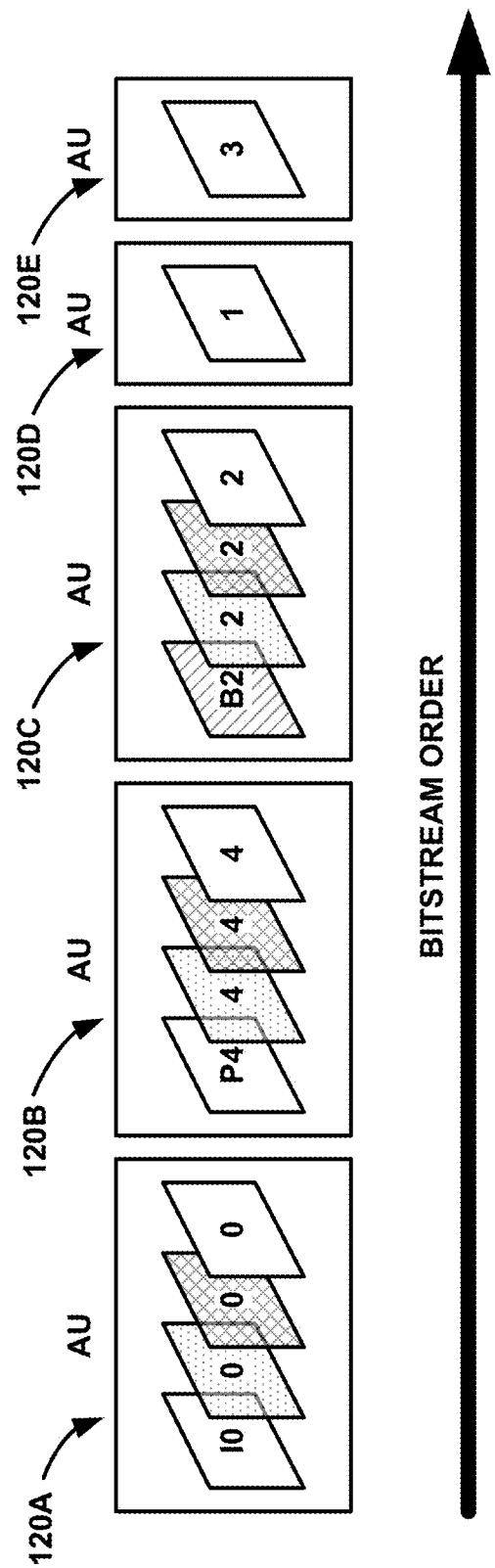
FIG. 6 is a conceptual illustration showing example scalable video coding access units in bitstream order.

FIG. 6 is a conceptual illustration showing example scalable video coding access units 120A-120E ("access units 120") in bitstream order. As shown in FIG. 6, the coded pictures or slices in the same time instance are successive in the bitstream order and form one access unit in the context of a scalable video coding standard, such as the SVC extension to H.264 or SHVC. The access units 120 then follow the decoding order, which could be different from the display order and determined, for example, by the temporal prediction relationship between access units 120.

For example, access unit 120A includes picture I0 from layer 0 112, picture 0 from layer 2 116, picture 0 from layer 3 117, and picture 0 from layer 4 118. Access unit 120B includes picture P4 from layer 0 112, picture 4 from layer 2 116, picture 4 from layer 3 117, and picture 4 from layer 4 118. Access unit 120C includes picture B2 from layer 1 114, picture 2 from layer 2 116, picture 2 from layer 3 117, and picture 2 from layer 4 118. Access unit 120D includes picture 1 from layer 4 118, and access unit 120E includes picture 3 from layer 4 118.

Figure 7:
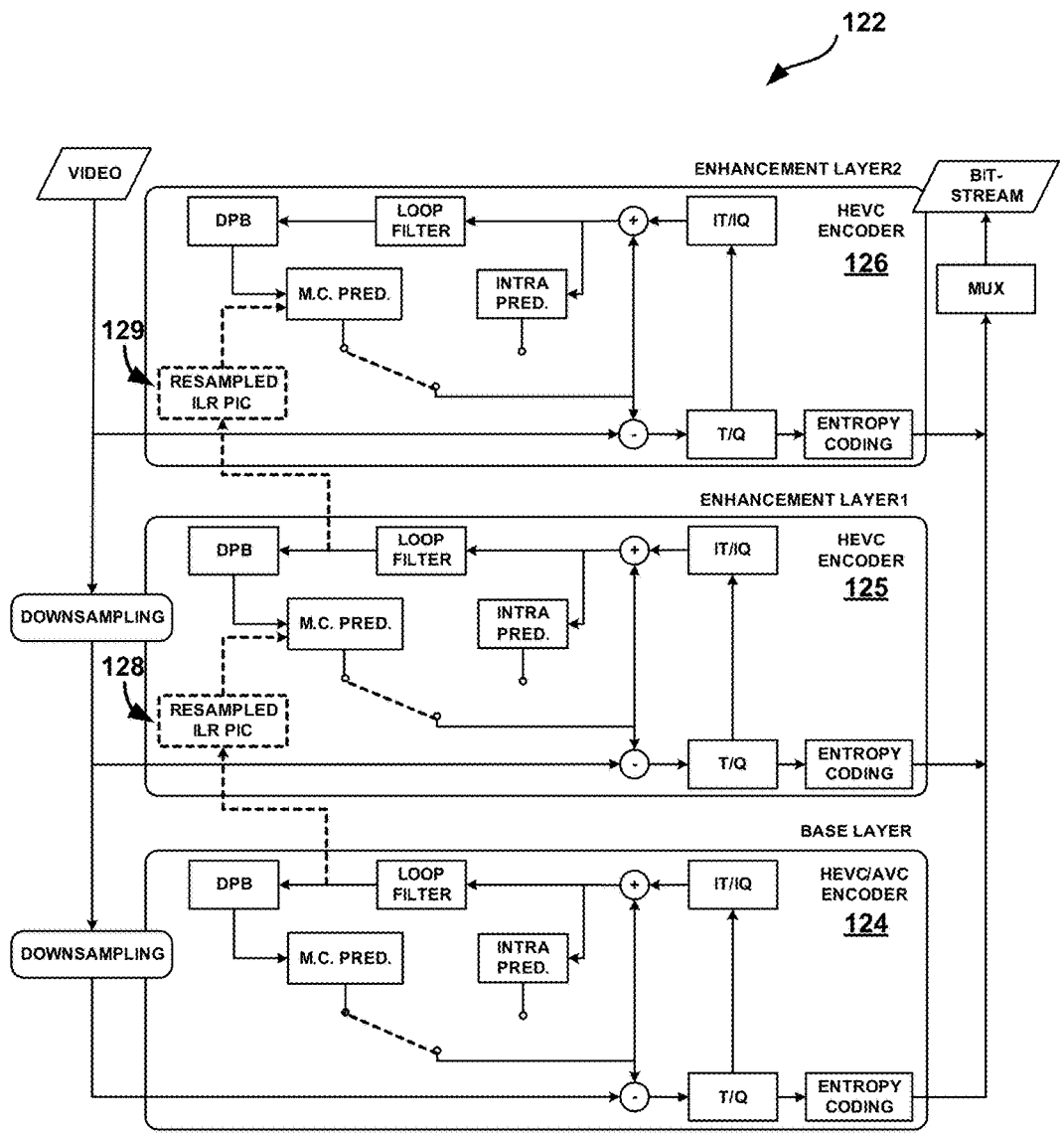
FIG. 7 is a block diagram illustrating an example scalable video coding extension to HEVC (SHVC) encoder.

FIG. 7 is a block diagram illustrating an example 3-layer SHVC encoder 122. As illustrated in FIG. 7, SHVC encoder 122 includes a base layer encoder 124, a first enhancement layer encoder 125 and a second enhancement layer encoder 126. In high-level syntax only SHVC, there are no new block level coding tools when compared to HEVC single layer coding. In SHVC, only slice and above level syntax changes and picture level operation, such as picture filtering or up-sampling, are allowed.

To reduce the redundancy between layers, up-sampled co-located reference layer pictures for a lower/base layer may be generated and stored in a reference buffer for a higher/enhancement layer so that inter-layer prediction may be achieved in the same way as inter-frame prediction within a single layer. As illustrated in FIG. 7, a resampled inter-layer reference (ILR) picture 128 is generated from a reference picture in base layer encoder 124 and stored in first enhancement layer encoder 125. Similarly, a resampled ILR picture 129 is generated from a reference picture in first enhancement layer encoder 125 and stored in second enhancement layer encoder 126. In SHVC WD3, the ILR picture is marked as a long term reference picture for the enhancement layer. The motion vector difference associated with an inter-layer reference picture is constrained to zero.

The upcoming deployment of ultra-high definition television (UHDTV) devices and content will use a different color gamut than legacy devices. Specifically, HD uses the BT.709 recommendation, ITU-R Recommendation BT.709 "Parameter values for the HDTV standards for production and international programme exchange" December 2010, while UHDTV will use the BT.2020 recommendation, ITU-R Recommendation BT.2020 "Parameter values for UHDTV systems for production and international programme exchange" April 2012. A color gamut comprises a complete range of colors that can be reproduced for an image, e.g., in a picture, slice, block or layer of video data. A key difference between these systems is that the color gamut of UHDTV is significantly larger than HD. It is asserted that UHDTV will provide a more life-like or realistic viewing experience, which is consistent with other UHDTV characteristics, such as high resolution.

Figure 8:
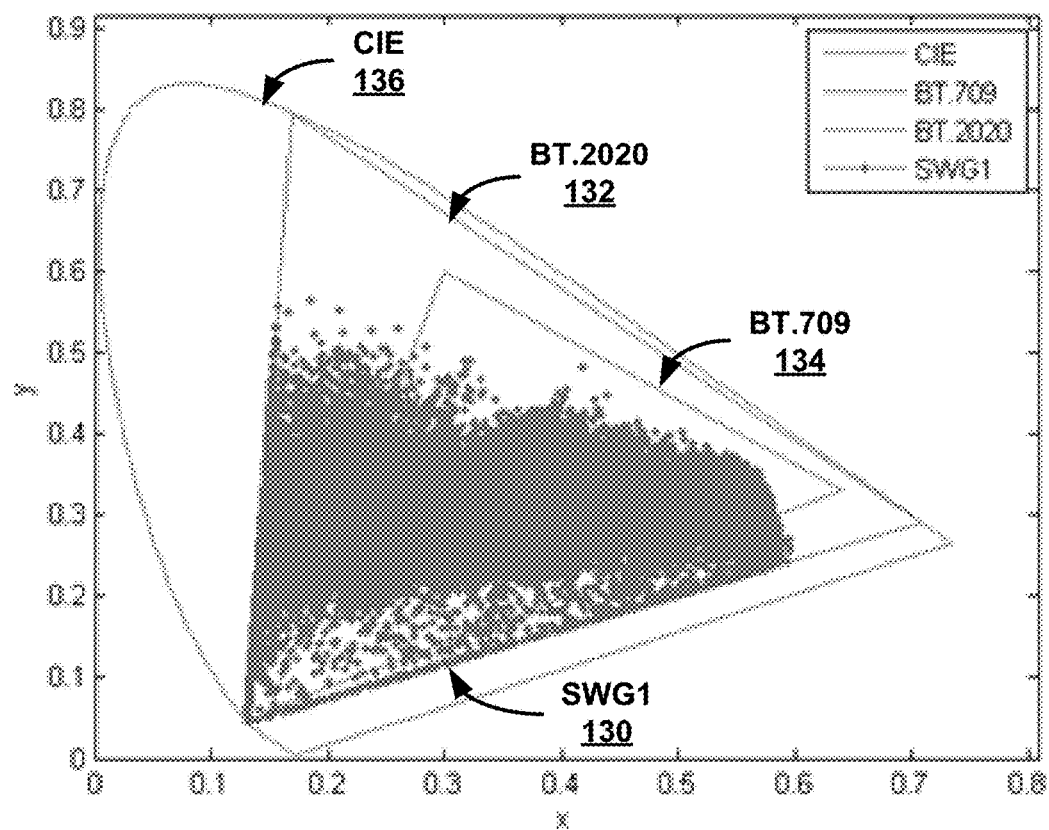
FIG. 8 is a graph illustrating an example color gamut of a sample video sequence.

FIG. 8 is a graph illustrating an example color gamut of a sample video sequence 130. As illustrated in FIG. 8, the SWG1 sample video sequence 130 is indicated as a cluster of dots within a line outline of the UHD color gamut BT.2020 132. For comparison purposes, an outline of the HD color gamut BT.709 134 and an outline of the International Commission on Illumination (CIE)-XYZ linear color space 136 overlays the SWG1 sample video sequence 130. It is easily observed from FIG. 8 that the UHD color gamut BT.2020 132 is much larger than the HD color gamut BT.709 134. Note the number of pixels in the SWG1 sample video sequence 130 that fall outside of the BT.709 color gamut 134.

Figure 9:
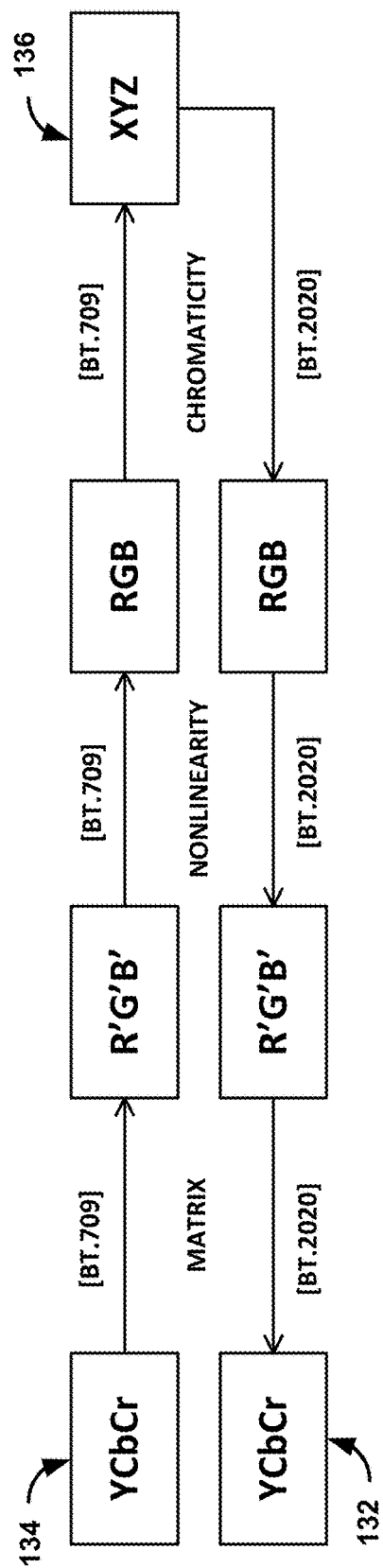
FIG. 9 is a block diagram illustrating conversion from high definition (HD) color gamut BT.709 to ultra-high definition (UHD) color gamut BT.2020.

FIG. 9 is a block diagram illustrating conversion from HD color gamut BT.709 134 to UHD color gamut BT.2020 132. Both the HD color gamut BT.709 134 and the UHD color gamut BT.2020 132 define representations of color pixels in luma and chroma components (e.g., YCbCr or YUV). Each color gamut defines conversion to and from the CIE-XYZ linear color space 136. This common intermediate color space may be used to define the conversion of the luma and chroma values in the HD color gamut BT.709 134 to corresponding luma and chroma values in the UHD color gamut BT.2020 132. More details regarding the color gamut of the sample sequence illustrated in FIG. 8 and the color gamut conversion illustrated in FIG. 9 may be found in L. Kerofsky, A. Segall, S.-H. Kim, K. Misra. "Color Gamut Scalable Video Coding: New Results," JCTVC-L0334, Joint Collaborative Team on Video Coding (JCT-VC) of ITU-T SG 16 WP 3 and ISO/IEC JTC 1/SC 29/WG 11, 12th Meeting, Geneva, CH. 14-23 Jan. 2013 (hereinafter referred to as "JCTVC-L0334").

Figure 10:
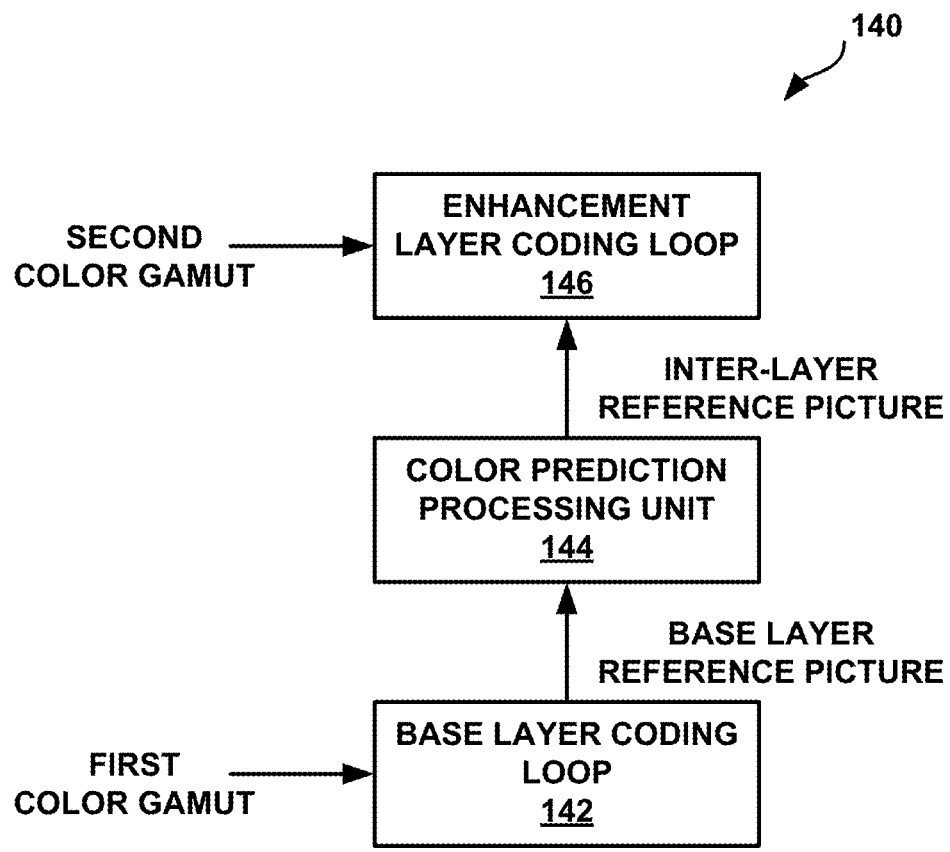
FIG. 10 is a block diagram illustrating a color gamut scalable coder including a color prediction processing unit that may generate an inter-layer reference picture when a base layer color gamut and an enhancement layer color gamut are different.

FIG. 10 is a block diagram illustrating a color gamut scalable coder 140 including a color prediction processing unit 144 that may generate an inter-layer reference picture when a base layer color gamut and an enhancement layer color gamut are different. Color prediction processing unit 144 may be used by a video coder, such as video encoder 20 from FIG. 2 or video decoder 30 from FIG. 3, to perform color gamut scalable video coding, in which the color gamut of the base and enhancement layer is different. In some cases, color prediction processing unit 144 may operate substantially similar to color prediction processing unit 66 of video encoder 20 from FIG. 2. In other cases, color prediction processing unit 144 may operate substantially similar to color prediction processing unit 86 of video decoder 30 from FIG. 3.

In the example illustrated in FIG. 10, a base layer coding loop 142 performs video coding of pictures that include color data in a first color gamut, e.g., BT.709, and an enhancement layer coding loop 146 performs video coding of pictures that include color data in a second color gamut, e.g., BT.2020. Color prediction processing unit 144 performs color prediction to map or convert color data of a base layer reference picture in the first color gamut to the second color gamut, and generates an inter-layer reference picture for the enhancement layer based on the mapped color data of the base layer reference picture.

To achieve high coding efficiency, color prediction processing unit 144 is configured to perform specific color prediction when generating inter-layer reference pictures. As described in more detail below, color prediction processing unit 144 may be configured to perform color prediction according to any of a linear prediction model, a piecewise linear prediction model, or a 3D lookup table based color prediction model.

A linear prediction model is proposed in JCTVC-L0334, referenced above. Generally, the color prediction process of the linear prediction model may be described as a gain and offset model. The linear prediction model operates on individual color planes. To facilitate integer calculation, a parameter describes the number of fractional bits used in the calculation using the parameter numFractionBits. For each channel, a gain[c] and offset[c] are specified. The linear prediction model is defined as follows:

$$\text{Pred}[c][x][y] = (\text{gain}[c] * \text{In}[x][y] + (1 << (\text{numFractionBits}-1))) >> \text{numFractionBits} + \text{offset}[c]$$

A piecewise linear prediction model is proposed in C. Auyeung, K. Sato, "AHG14: Color gamut scalable video coding with piecewise linear predictions and shift-offset model," JCTVC-N0271, Vienna, Austria, July 2013, based on JCTVC-L0334, referenced above. The color prediction process of the piecewise linear prediction model may also be described as a gain and offset model. The piecewise linear prediction model is defined as follows:

Let $d[c][x][y] = \text{In}[c][x][y] - \text{knot}[c]$.

If $d[c][x][y] <= 0$ $$\text{Pred}[c][x][y] = (\text{gain1}[c] * d[c][x][y] + \text{offset}[c] + (1 << (\text{numFractionBits}-1))) >> \text{numFractionBits}$$

else $$\text{Pred}[c][x][y] = (\text{gain2}[c] * d[c][x][y] + \text{offset}[c] + (1 << (\text{numFractionBits}-1))) >> \text{numFractionBits}$$

The prediction parameters knot[c], offset[c], gain1[c], and gain2[c] may be encoded in the bitstream.

FIGS. 11A and 11B are conceptual illustrations showing different views of an example 3D lookup table 150 for color gamut scalability. A 3D lookup table based color prediction model is proposed in P. Bordes, P. Andrivon. F. Hiron, "AHG14: Color Gamut Scalable Video Coding using 3D LUT: New Results," JCTVC-N0168. Joint Collaborative Team on Video Coding (JCT-VC) of ITU-T SG 16 WP 3 and ISO/IEC JTC 1/SC 29/WG 11, 14th Meeting, Vienna, Austria, July 2013 (hereinafter referred to as "JCTVC-N0168"). The principle of the 3D lookup table for color gamut scalability is depicted in FIGS. 11A and 11B. The 3D lookup table 150 can be considered as a sub-sampling of a first 3D color space, e.g., HD color gamut BT.709, where each vertex is associated with a color triplet value (y, u, v) corresponding to second 3D color space (i.e., predicted) values, e.g., UHD color gamut BT.2020).

In general, the first color gamut may be partitioned into octants or cuboids in each color dimension (i.e., Y, U, and V), and the vertices of the octants are associated with the color triplet value corresponding to the second color gamut and used to populate 3D lookup table 150. The number of vertices or segments in each color dimension indicates the size of 3D lookup table. FIG. 11A illustrates the vertices or intersecting lattice points of the octants in each color dimension of 3D lookup table 150. FIG. 11B illustrates the different color values associated with each of the vertices of 3D lookup table 150. As illustrated, in FIG. 11A each color dimension has four vertices and in FIG. 11B each color dimension includes four color values.

Figure 12:
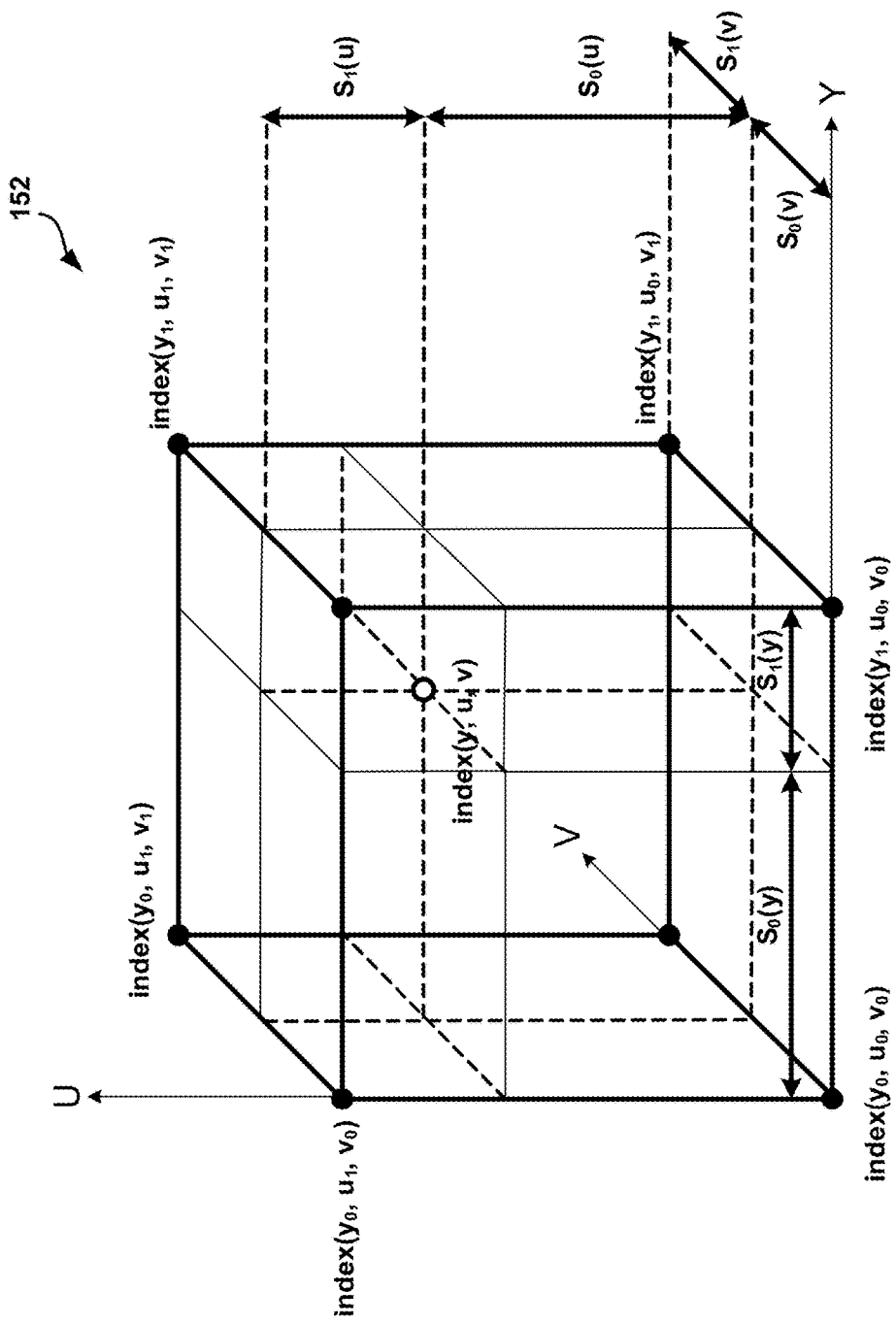
FIG. 12 is a conceptual illustration showing tri-linear interpolation with a 3D lookup table for color gamut scalability.

FIG. 12 is a conceptual illustration showing tri-linear interpolation with a 3D lookup table 152 for color gamut scalability. For a given base layer color sample in the first color gamut, the computation of its prediction in the second color gamut for an enhancement layer is made using tri-linear interpolation according to the following equation:

$$\overline{value}_y = K \times \Sigma_{i=0,1} \Sigma_{j=0,1} \Sigma_{k=0,1} s_i(y) \times s_j(u) \times s_k(v) \times LUT[y_i][u_j][v_k] \cdot y$$

Where:

$$K = \frac{1}{(y_1 - y_0) \times (u_1 - u_0) \times (v_i - v_0)}$$

$S_0(y) = y_1 - y$ and $S_1(y) = y - y_0$ $y_0$ is the index of the nearest sub-sampled vertex inferior to y, $y_1$ is the index of the nearest sub-sampled vertex superior to y.

More details of the 3D lookup table illustrated in FIGS. 11A and 11B and the tri-linear interpolation with the 3D lookup table illustrated in FIG. 12 may be found in JCTVC-N0168, cited above.

Figure 13:
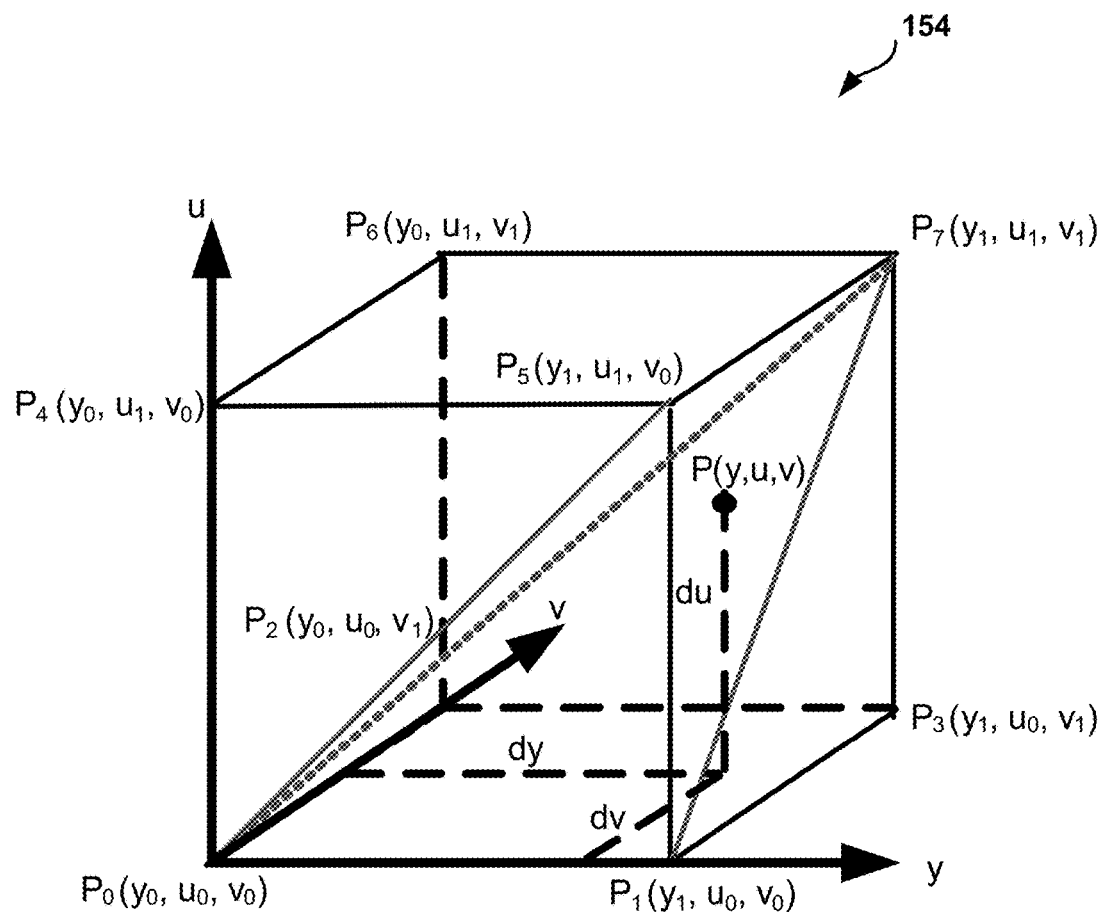
FIG. 13 is a conceptual illustration showing tetrahedral interpolation with a 3D lookup table for color gamut scalability.

FIG. 13 is a conceptual illustration showing tetrahedral interpolation with a 3D lookup table 154 for color gamut scalability. The tetrahedral interpolation may be used instead of the tri-linear interpolation described above to reduce the computational complexity of the 3D lookup table.

Figure 14:
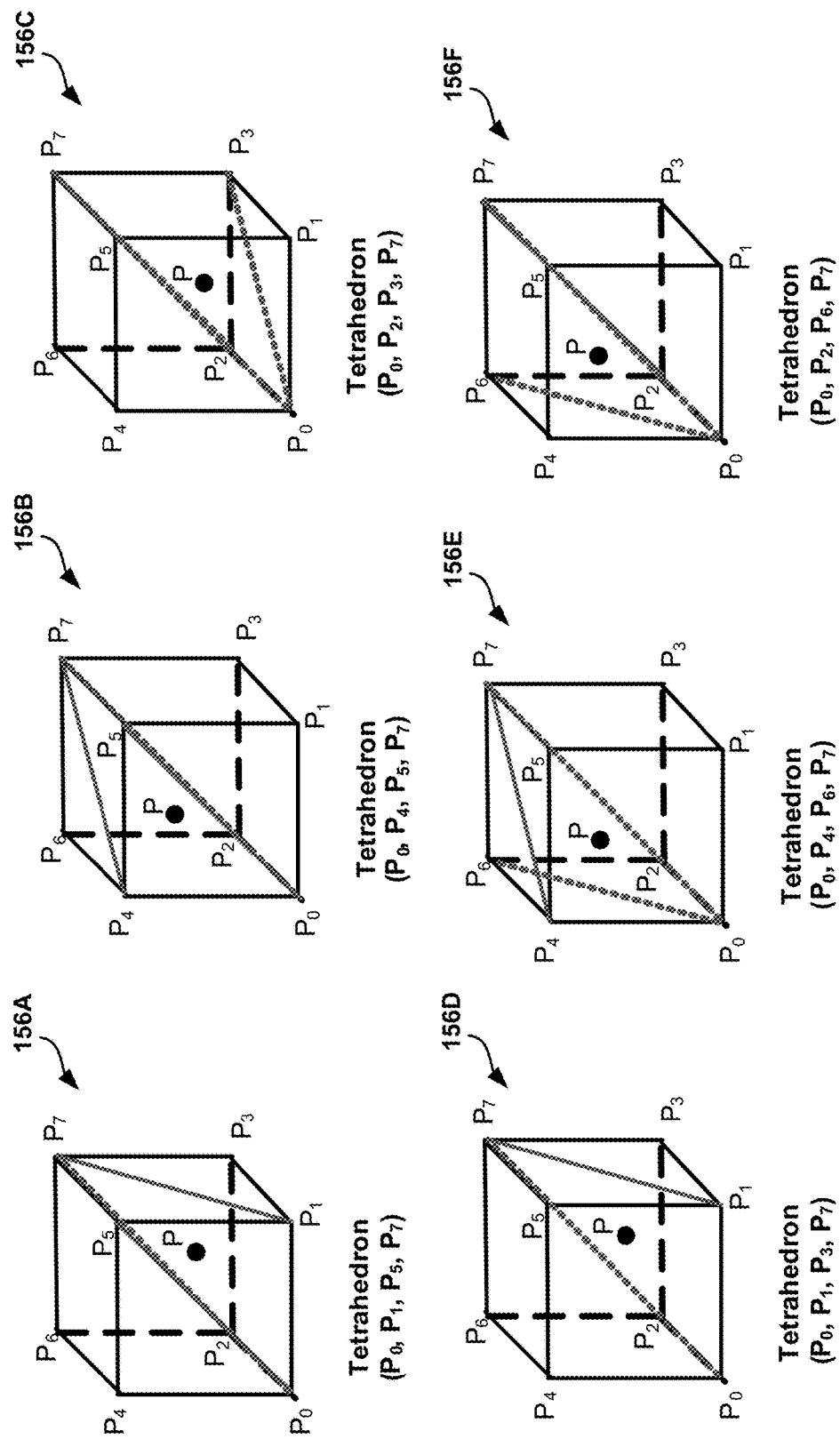
FIG. 14 is a conceptual illustration showing six examples of tetrahedrons used to encompass a point P of a 3D lookup table to be interpolated using tetrahedral interpolation.

FIG. 14 is a conceptual illustration showing six examples of tetrahedrons 156A-156F (collectively "tetrahedrons 156") used to encompass a point P of a 3D lookup table to be interpolated using tetrahedral interpolation. In the example of FIG. 14, there are six choices to determine the tetrahedron containing the point P to be interpolated in an octant of the 3D lookup table given that vertexes $P_0$ and $P_7$ have to be included in the tetrahedron. Using tetrahedral interpolation, the 3D lookup table may be designed for a fast decision instead of checking the relationship of each two components: y and u, y and v, u and v.

In U.S. patent application Ser. No. 14/512,177, filed Oct. 10, 2014, an asymmetric 3D LUT and an unbalanced 3D LUT were described. An asymmetric 3D lookup table may be used such that luma and chroma components have different table sizes, e.g., chroma components use coarser look up table and the luma component uses a more refined look up table. An unbalanced 3D lookup table may be used, i.e., table[M][N][K], where the size of each dimension is different such that the color mapping could be more accurate from the same color component, while less accurate from the other color component. 3D lookup table may only be used for the luma component, while 1-D Linear mapping or piecewise linear mapping is used for U and V components, respectively.

In U.S. patent application Ser. No. 14/571,939, filed Dec. 16, 2014, and U.S. patent application Ser. No. 14/572,002, filed Dec. 16, 2014, improvements to the asymmetric 3D LUT and unbalanced 3D LUT described above were described. For example, the described improvements include techniques for signaling partition information and/or color values used to generate a 3D LUT for color gamut scalability. More details can be found in the text of the relevant U.S. patent applications.

In the 17$^{th}$ JCT-VC meeting, asymmetric 3D lookup table based color gamut scalability proposed in JCTVC-Q0048 (Li, X., et al., "SCE1.2: Color gamut scalability with asymmetric 3D LUT," JCT-VC of ITU-T SG 16 WP 3 and ISO/IEC JTC 1/SC 29/WG 11, 17$^{th}$ Meeting: Valencia, ES, 27 Mar.-4 Apr. 2014) was adopted. The related syntax tables and semantics are as follows.

Colour Mapping Table RBSP Syntax

| colour_mapping_table( ) { | Descriptor |
|---|---|
| cm_octant_depth | u(2) |
| cm_y_part_num_log2 | u(2) |
| cm_input_bit_depth_minus8 | u(3) |
| cm_input_bit_depth_chroma_delta | se(v) |
| cm_output_bit_depth_minus8 | u(3) |
| cm_output_bit_depth_chroma_delta | se(v) |
| cm_res_quant_bit | u(2) |
| colour_mapping_table_octant( 0, 0, 0, 0, 1 << cm_octant_depth ) | |
| } | |

Colour Mapping Table Octant RBSP Syntax

| colour_mapping_table_octant( depth, yIdx, uIdx, vIdx, length ) { | Descriptor |
|---|---|
| if ( depth < cm_octant_depth ) | |
|   split_octant_flag | u(1) |
| if ( split_octant_flag ) { | |
|   for( k = 0; k < 2; k++ ) | |
|     for( m = 0; m < 2 ; m++ ) | |
|       for( n = 0; n < 2; n++ ) | |
|         colour_mapping_table_octant( depth + 1, | |
|           yIdx + YPartNum * k * length/2, uIdx + | |
|           m * length/2, vIdx + n * length/2, length/2) | |
| } | |
| else { | |
|   for( i = 0; i < YPartNum; i++ ) | |
|     for( vertex = 0; vertex < 4; vertex++ ) { | |
|       coded_vertex_flag[ yIdx + i ][ uIdx ][ vIdx ] | u(1) |
|       [ vertex ] | |
|       if( coded_vertex_flag[ yIdx + i ][ uIdx ] | |
|       [ vIdx ][ vertex ] ) { | |
|         resY[ yIdx + i ][ uIdx ][ vIdx ][ vertex ] | se(v) |
|         resU[ yIdx + i ][ uIdx ][ vIdx ][ vertex ] | se(v) |
|         resV[ yIdx + i ][ uIdx ][ vIdx ][ vertex ] | se(v) |
|       } | |
|     } | |
|   } | |
| } | |

Colour Mapping Table RBSP Semantics cm_octant_depth specifies the maximal split depth of the colour mapping table. In bitstreams conforming to this version of this Specification, the value of cm_octant_depth shall be in the range of 0 to 1, inclusive. The variable COctantNum is derived as follows.

$$COctantNum = 1 << cm\_octant\_depth$$

cm_y_part_num_log 2 specifies the number of partitions of the smallest colour mapping table octant for the luma component. The variables YOctantNum and YPartNum are derived as follows.

$$YOctantNum = 1 << (cm\_octant\_depth + cm\_y\_part\_num\_log 2)$$

$$YPartNum = 1 << cm\_y\_part\_num\_log 2$$

cm_input_bit_depth_luma_minus8 specifies the sample bit depth of the input luma component of the colour mapping process. The variable CMInputBitDepthY is derived as follows:

$$CMInputBitDepthY = 8 + cm\_input\_bit\_depth\_luma\_minus8$$

cm_input_bit depth_chroma delta specifies the sample bit depth of the input chroma components of the colour mapping process. The variable CMInputBitDepthC is derived as follows:

CMInputBitDepth$C$=CMInputBitDepth$Y$+cm_input_bit_depth_chroma_delta cm_output_bit_depth_luma_minus8 specifies the sample bit depth of the output luma component of the colour mapping process. The variable CMOutputBitDepthY is derived as follows:

CMOutputBitDepth$Y$=8+cm_output_bit_depth_luma_minus8 cm_output_bit_depth_chroma_delta specifies the sample bit depth of the output chroma components of the colour mapping process. The variable CMOutputBitDepthC is derived as follows:

CMOutputBitDepth$C$=CMOutputBitDepth$Y$+cm_output_bit_depth_chroma_delta cm_res_quant_bits specifies the number of least significant bits to be added to the vertex residual values res_y, res_u and res_v.

Colour Mapping Table Octant RBSP Semantics split_octant_flag equal to 1 specifies that the current colour mapping table octant is further split into eight octants with half length in each of the three dimensions. split_octant_flag equal to 0 specifies that the current colour mapping table octant is not further split into eight octants. When not present, the value of split_octant_flag is inferred to be equal to 0.

coded_vertex_flag [yIdx][uIdx][vIdx][vertex] equal to 1 specifies that the residuals for the vertex with index [yIdx][uIdx][vIdx][vertex] are present. coded_vertex_flag equal to 0 specifies that the residuals of the vertex with index [yIdx][uIdx][vIdx][vertex] are not present. When not present, the value of coded_vertex_flag is inferred to be equal to 0.

res_y[yIdx][uIdx][vIdx][vertex] specifies the prediction residual of the luma component for the vertex with index [yIdx][uIdx][vIdx][vertex]. When not present, the value of res_y[yIdx][uIdx][vIdx][vertex] is inferred to be equal to 0.

res_u[yIdx][uIdx][vIdx][vertex] specifies the prediction residual of the Cb component for the vertex with index [yIdx][uIdx][vIdx][vertex]. When not present, the value of res_u[yIdx][uIdx][vIdx][vertex] is inferred to be equal to 0.

res_v[yIdx][uIdx][vIdx][vertex] specifies the prediction residual of the Cr component for the vertex with index [yIdx][uIdx][vIdx][vertex]. When not present, the value of res_v[yIdx][uIdx][vIdx][vertex] is inferred to be equal to 0.

In the above example, for each octant for each of the color components, vertexes of the octant may be signaled. In this example, a residual value between a predicted value of a given vertex and an actual value of the given vertex may be signaled. In another example, for each octant for each of the color components, color mapping coefficients (i.e., a, b, c and d) for a linear color mapping function of color values in the 3D lookup table may be signaled instead of the vertexes of the octant. The linear color mapping function with color mapping parameters may be used directly to perform color prediction. The common linear color mapping function may be represented as follows.

$$\begin{bmatrix} Y_e \\ U_e \\ V_e \end{bmatrix} = \begin{bmatrix} a_{00} \cdot Y_b + b_{01} \cdot U_b + c_{02} \cdot V_b + d_{03} \\ a_{10} \cdot Y_b + b_{11} \cdot U_b + c_{12} \cdot V_b + d_{13} \\ a_{20} \cdot Y_b + b_{21} \cdot U_b + c_{22} \cdot V_b + d_{23} \end{bmatrix}$$

In the above example function, the subscript e and b denote the higher layer (i.e., enhancement layer) and lower layer (e.g., base layer), respectively, for each of the luma, first chroma, and second chroma color components (i.e., Y, U, and V). The parameters a, b, c, and, d represent the color mapping coefficients, which are weighting factors between color components of the lower and higher layers of the video data.

In the example technique of signaling color mapping coefficients for a linear color mapping function for each octant of the 3D lookup table, the colour_mapping_table_octant syntax table may indicate residual values that are the differences between the color mapping coefficients (i.e., a, b, c, and d) for the linear color mapping function of the octant and the predicted color mapping coefficient values for the octant, instead of signaling the vertex residual values resY[yIdx][uIdx][vIdx][vertex], resU[yIdx][uIdx][vIdx][vertex], and resV[yIdx][uIdx][vIdx][vertex]. The related syntax table and semantics are as follows.

Colour Mapping Octants Syntax

| colour_mapping_octants( inpDepth, idxY, idxCb, idxCr, inpLength ) { | Descriptor |
|---|---|
|   if( inpDepth < cm_octant_depth ) | |
|     split_octant_flag | u(1) |
|   if( split_octant_flag ) | |
|     for( k = 0; k < 2; k++ ) | |
|       for( m = 0; m < 2; m++ ) | |
|         for( n = 0; n < 2; n++ ) | |
|           colour_mapping_octants( inpDepth + 1, idxY + PartNumY * k * inpLength / 2, | |
|             idxCb + m * inpLength / 2, idxCr + n * inpLength / 2, inpLength / 2 ) | |
|   else | |
|     for( i = 0; i < PartNumY; i++ ) { | |
|       idxShiftY = idxY + ( ( i << ( cm_octant_depth − inpDepth ) ) | |
|       for( j = 0; j < 4; j++ ) { | |
|         coded_res_flag[ idxShiftY ][ idxCb ][ idxCr ][ j ] | u(1) |
|         if( coded_res_flag[ idxShiftY ][ idxCb ][ idxCr ][ j ] ) | |
|           for( c = 0; c < 3; c++ ) { | |
|             res_coeff_q[ idxShiftY ][ idxCb ][ idxCr ][ j ][ c ] | ue(v) |
|             res_coeff_r[ idxShiftY ][ idxCb ][ idxCr ][ j ][ c ] | u(v) |
|             if(res_coeff_q[ idxShiftY ][ idxCb ][ idxCr ][ j ][ c ] || | |
|               res_coeff_r[ idxShiftY ][ idxCb ][ idxCr ][ j ][ c ] ) | |
|               res_coeff_s[ idxShiftY ][ idxCb ][ idxCr ][ j ][ c ] | u(1) |
|           } | |
|       } | |
|     } | |
| } | |

Colour Mapping Octants Semantics split_octant_flag equal to 1 specifies that the current colour mapping octant is further split into eight octants with half length in each of the three dimensions. split_octant_flag equal to 0 specifies that the current colour mapping octant is not further split into eight octants. When not present, the value of split_octant_flag is inferred to be equal to 0.

coded_res_flag[idxShiftY][idxCb][idxCr][j] equal to 1 specifies that the residuals for the j-th colour mapping coefficients of the octant with octant index equal to (idxShiftY, idxCb, idxCr) are present. coded_res_flag[idxShiftY][idxCb][idxCr][j] equal to 0 specifies that the residuals for the j-th colour mapping coefficients of the octant with octant index equal to (idxShiftY, idxCb, idxCr) are not present. When not present, the value of coded_res_flag[idxShiftY][idxCb][idxCr][j] is inferred to be equal to 0.

res_coeff_q[idxShiftY][idxCb][idxCr][j][c] specifies the quotient of the residual for the j-th colour mapping coefficient of the c-th colour component of the octant with octant index equal to (idxShiftY, idxCb, idxCr). When not present, the value of res_coeff_q[idxShiftY][idxCb][idxCr][j][c] is inferred to be equal to 0.

res_coeff_r[idxShiftY][idxCb][idxCr][j][c] specifies the remainder of the residual for the j-th colour mapping coefficient of the c-th colour component of the octant with octant index equal to (idxShiftY, idxCb, idxCr). The number of bits used to code res_coeff_r is equal to CMResLSBits. If CMResLSBits is equal to 0, res_coeff_r is not present. When not present, the value of res_coeff_r[idxShiftY][idxCb][idxCr][j][c] is inferred to be equal to 0.

res_coeff_s[idxShiftY][idxCb][idxCr][j][c] specifies the sign of the residual for the j-th colour mapping coefficient of the c-th colour component of the octant with octant index equal to (idxShiftY, idxCb, idxCr). When not present, the value of res_coeff_s[idxShiftY][idxCb][idxCr][j][c] is inferred to be equal to 0.

The following potential issues have been identified in the asymmetric 3D lookup table based color gamut scalability (CGS) described above. As a first potential issue, in the current design of 3D color prediction for color gamut scalability, the bit depths of input and output color components of the color prediction process are both signaled by an encoder, which may not be necessary. In addition, the current syntax allows the reference layer signal (e.g., the base layer color components) and the input color components of the color prediction process to have different bit depths.

As a second potential issue, in the case of multiple reference layers, the current design defines a CGS table for an enhancement layer, but does not clearly define to which of the reference layers the signaled CGS table is applied in order to derive an inter-layer reference picture for the enhancement layer. As a third potential issue, the current syntax allows that inter-layer weighted prediction can be applied on top of the color prediction process, which may increase the complexity without bringing any coding gain benefit.

The techniques described in this disclosure may solve one or more of the issues mentioned above. The following techniques may each be applied individually. Alternatively, two or more of the techniques may be applied together.

As a first solution to the first potential issue described above, the input and output bit depths of the color prediction process are both signaled in the bitstream with constraints applied to one or both of the input and output bit depths at video encoder 20 and/or video decoder 30. In one example, video encoder 20 and/or video decoder 30 may be configured to constrain the bit depths of the input luma and chroma components of the CGS color prediction process such that they are equal to the bit depths of the luma and chroma components of the reference layer picture. In this example, the output signal of the reference layer (e.g., the color components of the reference layer picture) may be used as the input signal of the 3D lookup table for the CGS color prediction process.

In another example, video encoder 20 and/or video decoder 30 may be configured to constrain the bit depths of the output luma and chroma components of the CGS color prediction process such that they are equal to the bit depths of the luma and chroma components of the enhancement layer picture. In an alternative example, video encoder 20 and/or video decoder 30 may be configured to constrain the bit depths of the output luma and chroma components of the CGS color prediction process such that they are in a range between the bit depths of the luma and chroma components of the reference layer picture and the bit depths of the luma and chroma components of the enhancement layer picture, inclusively.

As a second solution to the first potential issue described above, only the output bit depths of the color prediction process are signaled in the bitstream and the input bit depths are not signaled in the bitstream with constraints applied to one or both of the input and output bit depths at video encoder 20 and/or video decoder 30. In this case, video decoder 30 derives the input bit depths of the color prediction process in accordance with the constraints. In one example, video encoder 20 and/or video decoder 30 may be configured to constrain the bit depths of the input luma and chroma components of the CGS color prediction process such that they are equal to the bit depths of the luma and chroma components of the reference layer picture.

In another example, video encoder 20 and/or video decoder 30 may be configured to constrain the bit depths of the output luma and chroma components of the CGS color prediction process such that they are equal to the bit depths of the luma and chroma components of the enhancement layer picture. As an alternative example, video encoder 20 and/or video decoder 30 may be configured to constrain the bit depths of the output luma and chroma components of the CGS color prediction process such that they are in a range between the bit depths of the luma and chroma components of the reference layer picture and the bit depths of the luma and chroma components of the enhancement layer picture, inclusively.

As a third solution to the first potential issue described above, the input and output bit depths of the color prediction process are not signaled in the bitstream, but are instead derived with constraints applied to one or both of the input and output bit depths at video encoder 20 and/or video decoder 30. In one example, video encoder 20 and/or video decoder 30 may be configured to derive the bit depths of the input luma and chroma components to the CGS color prediction process such that they are equal to the bit depths of the luma and chroma components of the reference layer picture. In another example, video encoder 20 and/or video decoder 30 are configured to derive the bit depths of the output luma and chroma components of the CGS color prediction process such that they are equal to the bit depths of the luma and chroma components of the enhancement layer picture.

As a solution to the second potential issue described above, in the case of multiple reference layers, video encoder 20 and/or video decoder 30 are constrained to apply a 3D lookup table for an enhancement layer to reference pictures only within one or more identified reference layers. The 3D lookup table is signaled in a picture parameter set (PPS) of the bitstream such that the 3D lookup table applies to one or more pictures referenced by the PPS. The PPS may reference one or more enhancement layer pictures in an enhancement layer of the video data, and one or more collocated reference layer pictures in one or more reference layers of the video data. In examples where the PPS includes a plurality of reference layers (e.g., more than one reference layer), the techniques of this disclosure identify at least one of the reference layers to which to apply the 3D lookup table to generate an inter-layer reference picture for a given enhancement layer picture.

For example, video encoder 20 may signal one or more reference layer identifiers (IDs) for a 3D lookup table for CGS, and video decoder 30 only applies the 3D lookup table to reference layer pictures in the one or more reference layers identified by the signaled reference layer IDs. The 3D lookup table is signaled for a given enhancement layer picture in order to perform CGS to generate an inter-layer reference picture for the enhancement layer picture. Video decoder 30 needs to know the one or more reference layers to which the 3D lookup table is to be applied to generate the inter-layer reference picture.

In some examples, reference layer pictures in two or more of the plurality reference layers may be used together to generate the inter-layer reference picture using the 3D lookup table for the enhancement layer picture. In this case, two or more reference layer IDs identifying the two or more reference layers are signaled in the bitstream. In other examples, a reference layer picture in only one of the plurality of reference layers may be used to generate the inter-layer reference picture using the 3D lookup table for the enhancement layer picture. In this case, one reference layer ID identifying the one reference layer is signaled in the bitstream.

As an additional example, to keep low computational complexity, video encoder 20 and/or video decoder 30 may be constrained to only apply the CGS color prediction process once for each enhancement layer picture even when multiple reference layers are available. In this example, for each enhancement layer picture, a reference layer picture in exactly one of the plurality reference layers may be used to generate the inter-layer reference picture using the 3D lookup table for the enhancement layer picture. Video encoder 20 may be constrained to signal exactly one reference layer ID for each enhancement layer picture, and video decoder 30 may be constrained to only apply the 3D lookup table to a reference layer picture in the exactly one reference layer identified by the signaled reference layer ID.

For two successive enhancement layer pictures, reference layer pictures in different reference layers may be used for the CGS color prediction process. For example, for a first enhancement layer picture, video encoder 20 and/or video decoder 30 may use a reference layer picture in a first reference layer to generate an inter-layer reference picture for the first enhancement layer picture. For a second enhancement layer picture, video encoder 20 and/or video decoder 30 may use a reference layer picture in a second reference layer different from the first reference layer to generate an inter-layer reference picture for the second enhancement layer picture.

One example of signaling reference layer IDs in a 3D lookup table for CGS is described below. Additions to the syntax and semantics of the colour_mapping_table presented above are indicated by italicized text.

| colour_mapping_table( ) { | Descriptor |
|---|---|
|    cm_inter_layer_ref_idc | u(6) or ue(v) |
|    cm_octant_depth | u(2) |
|    cm_y_part_num_log2 | u(2) |
|    cm_input_bit_depth_minus8 | u(3) |
|    cm_input_bit_depth_chroma_delta | se(v) |
|    cm_outpt_bit_depth_minus8 | u(3) |
|    cm_output_bit_depth_chroma_delta | se(v) |
|    cm_res_quant_bit | u(2) |
|    colour_mapping_table_octant( 0, 0, 0, 0, 1 << | |
|    cm_octant_depth ) | |
| } | | cm_inter_layer_ref_idc specifies the nuh_layer_id of the reference layer picture to which the color prediction process specified by the current color mapping table is applied when the inter-layer picture is derived.

Another example of signaling reference layer IDs in a 3D lookup table for CGS is described below. Additions to the syntax and semantics of the colour_mapping_table are indicated by italicized text.

| colour_mapping_table( ) { | Descriptor |
|---|---|
|    *num_cm_ref_layers_minus1* | *ue(v)* |
|    *for( i = 0; i <= num_cm_ref_layers_minus1; i++ )* | |
|      *cm_ref_layer_id[ i ]* | *u(6)* |
|    cm_octant_depth | u(2) |
|    cm_y_part_num_log2 | u(2) |
|    luma_bit_depth_cm_input_minus8 | ue(v) |
|    chroma_bit_depth_cm_input_minus8 | ue(v) |
|    luma_bit_depth_cm_output_minus8 | ue(v) |
|    chroma_bit_depth_cm_output_minus8 | ue(v) |
|    cm_res_quant_bits | u(2) |
|    cm_delta_flc_bits_minus1 | u(2) |
|    if( cm_octant_depth = = 1 ) { | |
|      cm_adapt_threshold_u_delta | se(v) |
|      cm_adapt_threshold_v_delta | se(v) |
|    } | |
|    colour_mapping_octants( 0, 0, 0, 0, 1 << | |
|    cm_octant_depth ) | |
| } | | num_cm_ref_layers_minus1 specifies the number of the following cm_ref_layer_id[i] syntax elements. The value of num_cm_ref_layers_minus1 shall be in the range of 0 to 61, inclusive.

cm_ref_layer_id[i] specifies the nuh_layer_id value of the associated direct reference layer picture for which the colour mapping table is specified.

As a solution to the third potential issue described above, to keep low computational complexity, video encoder 20 and/or video decoder 30 are constrained so as to not apply weighted prediction on an inter-layer reference picture generated by the CGS color prediction process. In this case, the inter-layer reference picture generated for an enhancement layer picture using a 3D lookup table applied to one or more reference layer pictures is itself used to predict the enhancement layer picture. The inter-layer reference picture is not used as a candidate reference picture in a group of candidate reference pictures in the case of weighted prediction for the enhancement layer picture.

Figure 2:
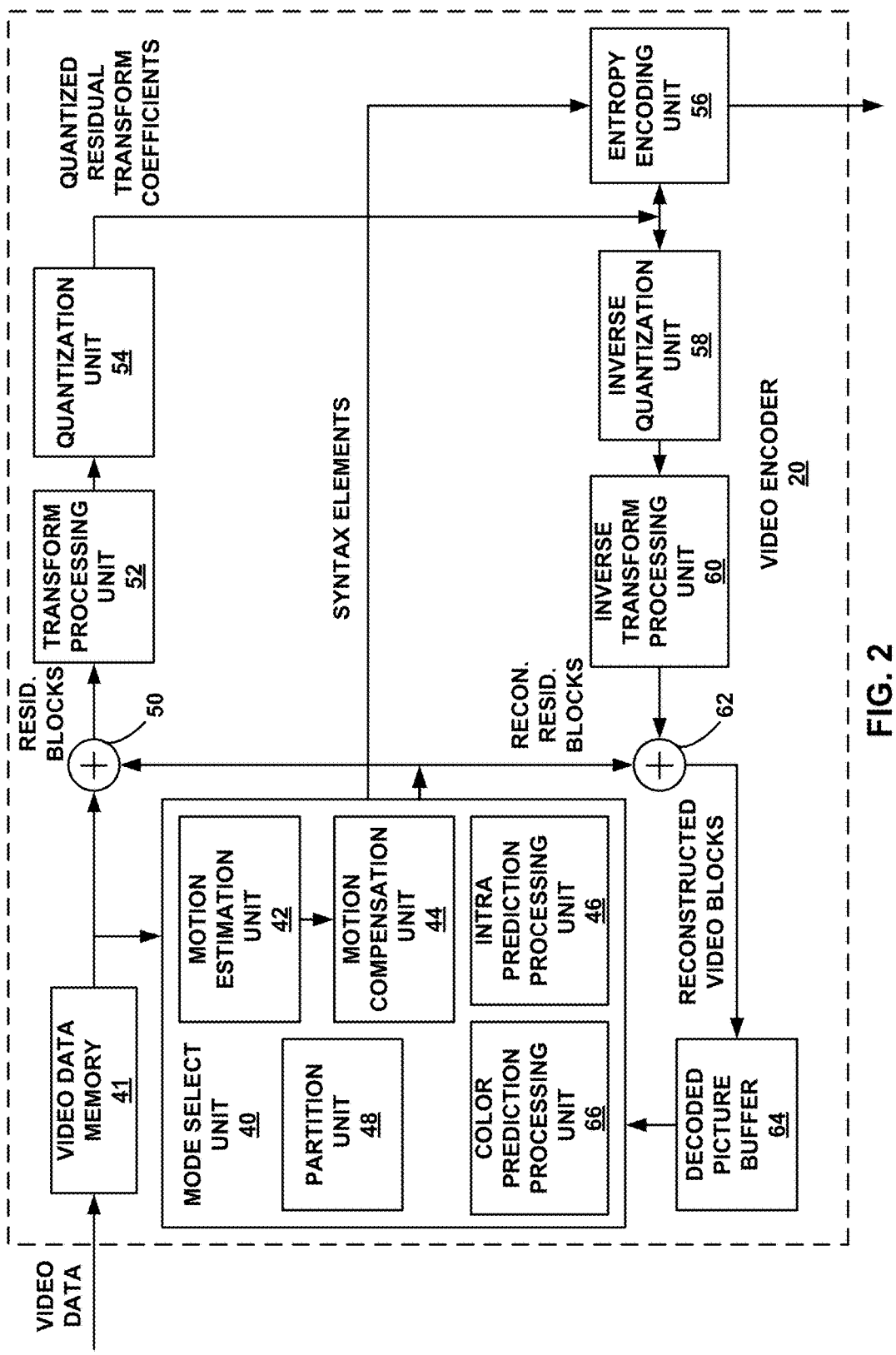
FIG. 2 is a block diagram illustrating an example of a video encoder that may implement techniques described in this disclosure.

FIG. 2 is a block diagram illustrating an example of video encoder 20 that may implement techniques described in this disclosure. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 2, video encoder 20 receives a current video block within a video frame to be encoded. In the example of FIG. 2, video encoder 20 includes mode select unit 40, a video data memory 41, a decoded picture buffer 64, a summer 50, a transform processing unit 52, a quantization unit 54, and an entropy encoding unit 56. Mode select unit 40, in turn, includes a motion compensation unit 44, a motion estimation unit 42, an intra-prediction unit 46, and a partition unit 48. For video block reconstruction, video encoder 20 also includes an inverse quantization unit 58, an inverse transform processing unit 60, and a summer 62. A deblocking filter (not shown in FIG. 2) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

Video data memory 41 may store video data to be encoded by the components of video encoder 20. The video data stored in video data memory 41 may be obtained, for example, from video source 18. Decoded picture buffer 64 may be a reference picture memory that stores reference video data for use in encoding video data by video encoder 20, e.g., in intra- or inter-coding modes. Video data memory 41 and decoded picture buffer 64 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 41 and decoded picture buffer 64 may be provided by the same memory device or separate memory devices. In various examples, video data memory 41 may be on-chip with other components of video encoder 20, or off-chip relative to those components.

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal prediction. Intra-prediction unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, intra or inter, e.g., based on error results, and provides the resulting intra- or inter-coded block to summer 50 to generate residual block data and to summer 62 to reconstruct the encoded block for use as a reference frame. Mode select unit 40 also provides syntax elements, such as motion vectors, intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference picture (or other coded unit) relative to the current block being coded within the current picture (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in decoded picture buffer 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in decoded picture buffer 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction unit 46 may calculate ratios from the distortions and rates for the various encoded blocks to determine which intra-prediction mode exhibits the best rate-distortion value for the block.

After selecting an intra-prediction mode for a block, intra-prediction unit 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used. In any case, transform processing unit 52 applies the transform to the residual block, producing a block of residual transform coefficients. The transform may convert the residual information from a pixel value domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy codes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform processing unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of decoded picture buffer 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in decoded picture buffer 64. The reconstructed video block may be used by motion estimation unit 42 and motion compensation unit 44 as a reference block to intercode a block in a subsequent video frame.

Video encoder 20 represents an example of a video encoder that may be configured to perform the techniques of this disclosure, alone or in any combination.

Video encoder 20 may represent a video encoding device comprising one or more processors configured to perform 3D color prediction with constrained bit depths of input color components to a 3D lookup table. In this case, color prediction processing unit 66 of video encoder 20 determines input bit depths of the 3D lookup table to be equal to bit depths of color components of a reference layer picture in a reference layer of the video data. In this way, the input bit depth of the 3D lookup table is equal to the bit depth of color components of the reference layer picture, which may be input to the 3D lookup table for conversion to generate an inter-layer reference picture for an enhancement layer picture. In some examples, color prediction processing unit 66 may also determine output bit depths of the 3D lookup table to be within a range that is greater than or equal to the bit depths of the color components of the reference layer picture and less than or equal to bit depths of color components of the enhancement layer picture. In one example, color prediction processing unit 66 may determine the output bit depths of the 3D lookup table to be equal to the bit depths of the color components of the enhancement layer picture.

Color prediction processing unit 66 applies the 3D lookup table to the color components of the reference layer picture to convert the color components from a first color gamut and/or a first bit depth for the reference layer of the video data to a second color gamut and/or a second bit depth for the enhancement layer of the video data. Color prediction processing unit 66 generates an inter-layer reference picture for the enhancement layer picture in the enhancement layer of the video data based on the converted color components. Video encoder 20 encodes video blocks in the enhancement layer picture based on the inter-layer reference picture generated using the 3D lookup table.

According to one example of the techniques of this disclosure, video encoder 20 may signal a first syntax element indicating a first bit depth for an input luma component of the 3D lookup table that is equal to a bit depth of a luma component of the reference layer picture, and signal a second syntax element indicating a second bit depth for input chroma components of the 3D lookup table that is equal to a bit depth of chroma components of the reference layer picture. Additionally or alternatively, video encoder 20 may signal a third syntax element indicating a third bit depth for an output luma component of the 3D lookup table that is greater than or equal to the bit depth of the luma component of the reference layer picture and less than or equal to a bit depth of a luma component of the enhancement layer picture, and signal a fourth syntax element indicating a fourth bit depth for output chroma components of the 3D lookup table that is greater than or equal to the bit depth of the chroma components of the reference layer picture and less than or equal to a bit depth of chroma components of the enhancement layer picture.

In another example of the techniques of this disclosure, color prediction processing unit 66 may determine the first bit depth for the input luma component of the 3D lookup table, and determine the second bit depth for the input chroma components of the 3D lookup table, without signaling the first and second syntax elements indicating the first and second bit depths. Additionally or alternatively, color prediction processing unit 66 may determine the third bit depth for the output luma component of the 3D lookup table, and determine the fourth bit depth for output chroma components of the 3D lookup table, without signaling the third and fourth syntax elements indicating the third and fourth bit depths.

In addition, video encoder 20 may represent a video encoding device comprising one or more processors configured to perform 3D color prediction with constrained application only to reference pictures in at least one determined reference layer from a plurality of available reference layers of the video data. In this case, color prediction processing unit 66 of video encoder 20 determines at least one reference layer of the plurality of reference layers for a 3D lookup table. Color prediction processing unit 66 applies the 3D lookup table to color components of a reference layer picture in the at least one reference layer to convert the color components from a first color gamut and/or first bit depth for the reference layer of the video data to a second color gamut and/or second bit depth for the enhancement layer of the video data. Color prediction processing unit 66 generates an inter-layer reference picture for the enhancement layer picture in the enhancement layer of the video data based on the converted color components. Video encoder 20 encodes video blocks in the enhancement layer picture based on the inter-layer reference picture generated using the 3D lookup table.

According to the disclosed techniques, video encoder 20 signals at least one reference layer ID identifying the at least one reference layer to which the 3D lookup table is applied. In one example, video encoder 20 may signal exactly one reference layer ID identifying exactly one reference layer to which the 3D lookup table is applied for the enhancement layer picture. In this example, color prediction processing unit 66 determines the exactly one reference layer for the 3D lookup table, and applies the 3D lookup table to color components of a reference layer picture in the exactly one reference layer. By applying the 3D lookup table to reference layer pictures in only one reference layer to generate an inter-layer reference picture for the enhancement layer picture, video encoder 20 reduces computation complexity at video decoder 30.

In another example, video encoder 20 may signal two or more reference layer IDs identifying two or more reference layers to which the 3D lookup table is applied for the enhancement layer picture. In this example, color prediction processing unit 66 determines the two or more reference layers for the 3D lookup table, applies the 3D lookup table to color components of a reference layer picture in each of the two or more reference layers, and generates the inter-layer reference picture for the enhancement layer picture based on a combination of the converted color components from the two or more reference layers.

In a further example, for a first enhancement layer picture in the enhancement layer, color prediction processing unit 66 may signal a first reference layer ID identifying a first reference layer to which the 3D lookup table is applied to generate a first inter-layer reference picture for the first enhancement layer picture in the enhancement layer. For a second enhancement layer picture in the enhancement layer, which may be a subsequent picture to the first enhancement layer picture in either display order or coding order, color prediction processing unit 66 may signal a second reference layer ID identifying a second reference layer of the plurality of reference layers to which the 3D lookup table is applied to generate a second inter-layer reference picture for the second enhancement layer picture in the enhancement layer, where the second reference layer is different than the first reference layer.

Furthermore, video encoder 20 may represent a video encoding device comprising one or more processors configured to perform 3D color prediction without performing weighted prediction on an inter-layer reference picture generated by a 3D lookup table. Color prediction processing unit 66 of video encoder 20 generates an inter-layer reference picture for an enhancement layer picture in an enhancement layer using a 3D lookup table applied to color components of reference layer pictures in at least one reference layer. According to the disclosed techniques, the inter-layer reference picture itself is used to predict the enhancement layer picture. The inter-layer reference picture is not used as a candidate reference picture in a group of candidate reference pictures in the case of weighted prediction for the enhancement layer picture. By not applying weighted prediction on the inter-layer reference picture, video encoder 20 reduces computation complexity at video decoder 30.

Figure 3:
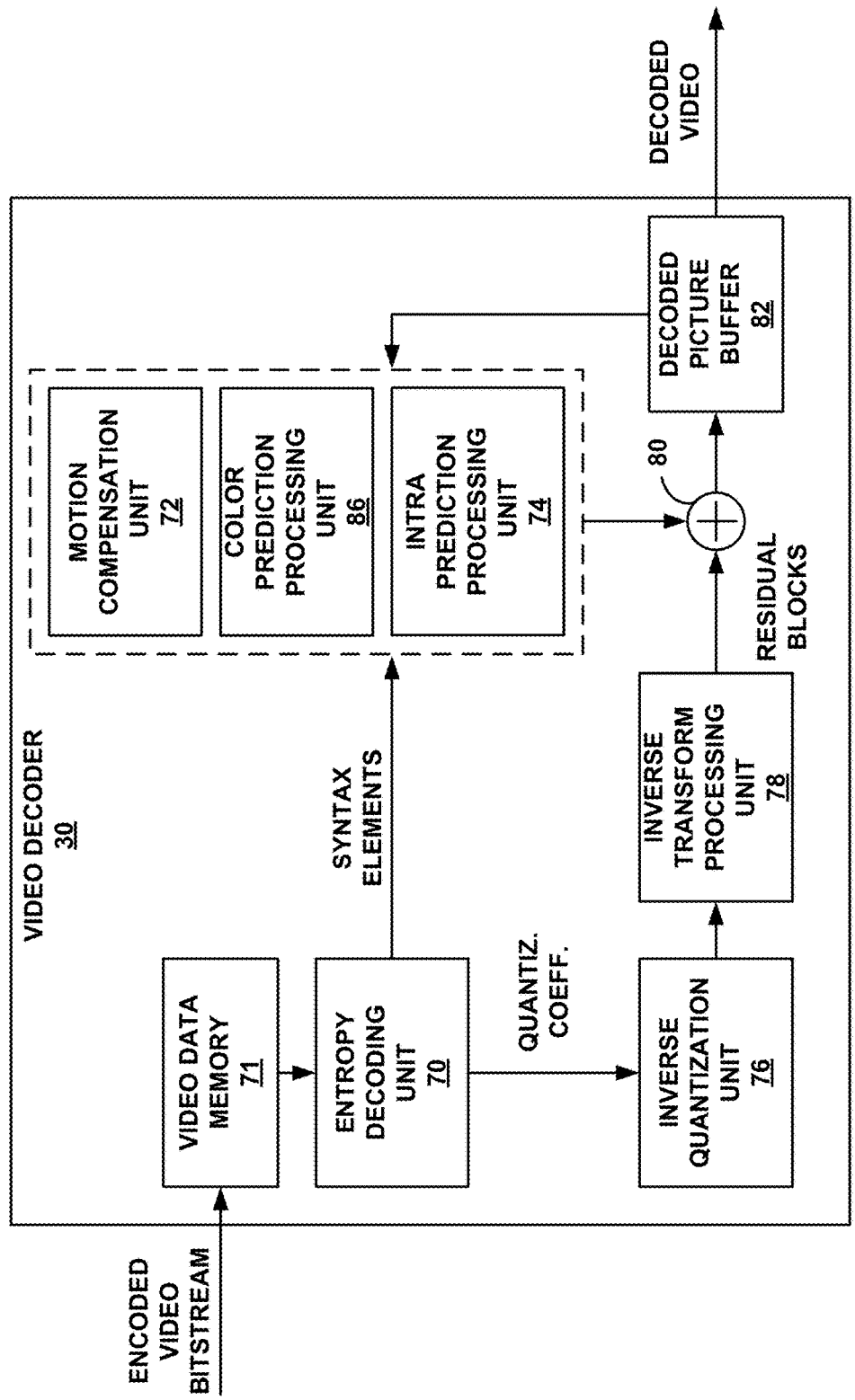
FIG. 3 is a block diagram illustrating an example of a video decoder that may implement techniques described in this disclosure.

FIG. 3 is a block diagram illustrating an example of video decoder 30 that may implement techniques described in this disclosure. In the example of FIG. 3, video decoder 30 includes an entropy decoding unit 70, a video data memory 71, a motion compensation unit 72, a color prediction processing unit 86, an intra-prediction unit 74, an inverse quantization unit 76, an inverse transform processing unit 78, a decoded picture buffer 82 and a summer 80. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70, while intra-prediction unit 74 may generate prediction data based on intra-prediction mode indicators received from entropy decoding unit 70.

Video data memory 71 may store video data, such as an encoded video bitstream, to be decoded by the components of video decoder 30. The video data stored in video data memory 71 may be obtained, for example, from computer-readable medium 16, e.g., from a local video source, such as a camera, via wired or wireless network communication of video data, or by accessing physical data storage media. Video data memory 71 may form a coded picture buffer (CPB) that stores encoded video data from an encoded video bitstream. Decoded picture buffer 82 may be a reference picture memory that stores reference video data for use in decoding video data by video decoder 30, e.g., in intra- or inter-coding modes. Video data memory 71 and decoded picture buffer 82 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 71 and decoded picture buffer 82 may be provided by the same memory device or separate memory devices. In various examples, video data memory 71 may be on-chip with other components of video decoder 30, or off-chip relative to those components.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors to and other syntax elements to motion compensation unit 72. Video decoder 30 may receive the syntax elements at the video slice level and/or the video block level.

When the video slice is coded as an intra-coded (I) slice, intra-prediction unit 74 may generate prediction data for a video block of the current video slice based on a signaled intra-prediction mode and data from previously decoded blocks of the current frame or picture. When the video frame is coded as an inter-coded (i.e., B or P) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference picture lists, List 0 and List 1, using default construction techniques based on reference pictures stored in decoded picture buffer 82.

Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice or P slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Inverse quantization unit 76 inverse quantizes, i.e., de-quantizes, the quantized transform coefficients provided in the bitstream and decoded by entropy decoding unit 70. The inverse quantization process may include use of a quantization parameter calculated by video decoder 30 for each video block in the video slice to determine a degree of quantization and, likewise, a degree of inverse quantization that should be applied. Inverse transform processing unit 78 applies an inverse transform, e.g., an inverse DCT, an inverse integer transform, or a conceptually similar inverse transform process, to the transform coefficients in order to produce residual blocks in the pixel domain.

After motion compensation unit 72 generates the predictive block for the current video block based on the motion vectors and other syntax elements, video decoder 30 forms a decoded video block by summing the residual blocks from inverse transform processing unit 78 with the corresponding predictive blocks generated by motion compensation unit 72. Summer 80 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in decoded picture buffer 82, which stores reference pictures used for subsequent motion compensation. Decoded picture buffer 82 also stores decoded video for later presentation on a display device, such as display device 32 of FIG. 1.

Video decoder 30 may be configured to perform the techniques of this disclosure, alone or in any combination.

Video decoder 30 may represent a video decoding device comprising one or more processors configured to perform 3D color prediction with constrained bit depths of input color components to a 3D lookup table. In this case, color prediction processing unit 86 of video decoder 30 determines input bit depths of the 3D lookup table to be equal to bit depths of color components of a reference layer picture in a reference layer of the video data. In this way, the input bit depth of the 3D lookup table is equal to the bit depth of color components of the reference layer picture, which may be input to the 3D lookup table for conversion to generate an inter-layer reference picture for an enhancement layer picture. In some examples, color prediction processing unit 86 may also determine output bit depths of the 3D lookup table to be within a range that is greater than or equal to the bit depths of the color components of the reference layer picture and less than or equal to bit depths of color components of the enhancement layer picture. In one example, color prediction processing unit 86 may determine the output bit depths of the 3D lookup table to be equal to the bit depths of the color components of the enhancement layer picture.

According to one example of the techniques of this disclosure, color prediction processing unit 86 may receive a first syntax element indicating a first bit depth for an input luma component of the 3D lookup table that is equal to a bit depth of a luma component of the reference layer picture, and receive a second syntax element indicating a second bit depth for input chroma components of the 3D lookup table that is equal to a bit depth of chroma components of the reference layer picture. Additionally or alternatively, color prediction processing unit 86 may receive a third syntax element indicating a third bit depth for an output luma component of the 3D lookup table that is greater than or equal to the bit depth of the luma component of the reference layer picture and less than or equal to a bit depth of a luma component of the enhancement layer picture, and receive a fourth syntax element indicating a fourth bit depth for output chroma components of the 3D lookup table that is greater than or equal to the bit depth of the chroma components of the reference layer picture and less than or equal to a bit depth of chroma components of the enhancement layer picture.

In another example of the techniques of this disclosure, color prediction processing unit 86 may independently derive the first bit depth for the input luma component of the 3D lookup table, and independently derive the second bit depth for the input chroma components of the 3D lookup table, without receiving the first and second syntax elements including the first and second bit depths. Additionally or alternatively, color prediction processing unit 86 may independently derive the third bit depth for the output luma component of the 3D lookup table, and independently derive the fourth bit depth for output chroma components of the 3D lookup table, without receiving the third and fourth syntax elements indicating the third and fourth bit depths.

Color prediction processing unit 86 applies the 3D lookup table to the color components of the reference layer picture to convert the color components from a first color gamut and/or a first bit depth for the reference layer of the video data to a second color gamut and/or a second bit depth for the enhancement layer of the video data. Color prediction processing unit 86 generates an inter-layer reference picture for the enhancement layer picture in the enhancement layer of the video data based on the converted color components. Video decoder 30 then decodes video blocks in the enhancement layer picture based on the inter-layer reference picture generated using the 3D lookup table.

In addition, video decoder 30 may represent a video decoding device comprising one or more processors configured to perform 3D color prediction with constrained application only to reference pictures in at least one identified reference layer from a plurality of available reference layers of the video data. In this case, color prediction processing unit 86 of video decoder 30 receives at least one reference layer ID identifying at least one reference layer of the plurality of reference layers for a 3D lookup table. Color prediction processing unit 86 applies the 3D lookup table to color components of a reference layer picture in the at least one reference layer identified by the at least one reference layer ID to convert the color components from a first color gamut and/or first bit depth for the reference layer of the video data to a second color gamut and/or second bit depth for the enhancement layer of the video data. Color prediction processing unit 86 generates an inter-layer reference picture for the enhancement layer picture in the enhancement layer of the video data based on the converted color components. Video decoder 30 then decodes video blocks in the enhancement layer picture based on the inter-layer reference picture generated using the 3D lookup table.

In one example of the disclosed techniques, color prediction processing unit 86 of video decoder 30 may receive exactly one reference layer ID identifying exactly one reference layer to which the 3D lookup table is applied for the enhancement layer picture. In this example, color prediction processing unit 86 then applies the 3D lookup table to color components of a reference layer picture in the exactly one reference layer identified by the exactly one reference layer ID. Applying the 3D lookup table to reference layer pictures in only one reference layer to generate an inter-layer reference picture for the enhancement layer picture reduces computation complexity at video decoder 30.

In another example of the disclosed techniques, color prediction processing unit 86 of video decoder 30 may receive two or more reference layer IDs identifying two or more reference layers to which the 3D lookup table is applied for the enhancement layer picture. In this example, color prediction processing unit 86 then applies the 3D lookup table to color components of a reference layer picture in each of the two or more reference layers identified by the two or more reference layer IDs, and generates the inter-layer reference picture for the enhancement layer picture based on a combination of the converted color components from the two or more reference layers.

In a further example of the disclosed techniques, for a first enhancement layer picture in the enhancement layer, color prediction processing unit 86 may receive a first reference layer ID identifying a first reference layer to which the 3D lookup table is applied to generate a first inter-layer reference picture for the first enhancement layer picture in the enhancement layer. For a second enhancement layer picture in the enhancement layer, which may be a subsequent picture to the first enhancement layer picture in either display order or coding order, color prediction processing unit 86 may receive a second reference layer ID identifying a second reference layer of the plurality of reference layers to which the 3D lookup table is applied to generate a second inter-layer reference picture for the second enhancement layer picture in the enhancement layer, where the second reference layer is different than the first reference layer.

Furthermore, video decoder 30 may represent a video decoding device comprising one or more processors configured to perform 3D color prediction without performing weighted prediction on an inter-layer reference picture generated by a 3D lookup table. Color prediction processing unit 86 of video decoder 30 generates an inter-layer reference picture for an enhancement layer picture in an enhancement layer using a 3D lookup table applied to color components of reference layer pictures in at least one reference layer. According to the disclosed techniques, the inter-layer reference picture itself is used to predict the enhancement layer picture. The inter-layer reference picture is not used as a candidate reference picture in a group of candidate reference pictures in the case of weighted prediction for the enhancement layer picture. Not applying weighted prediction on the inter-layer reference picture reduces computational complexity at video decoder 30.

Figure 15:
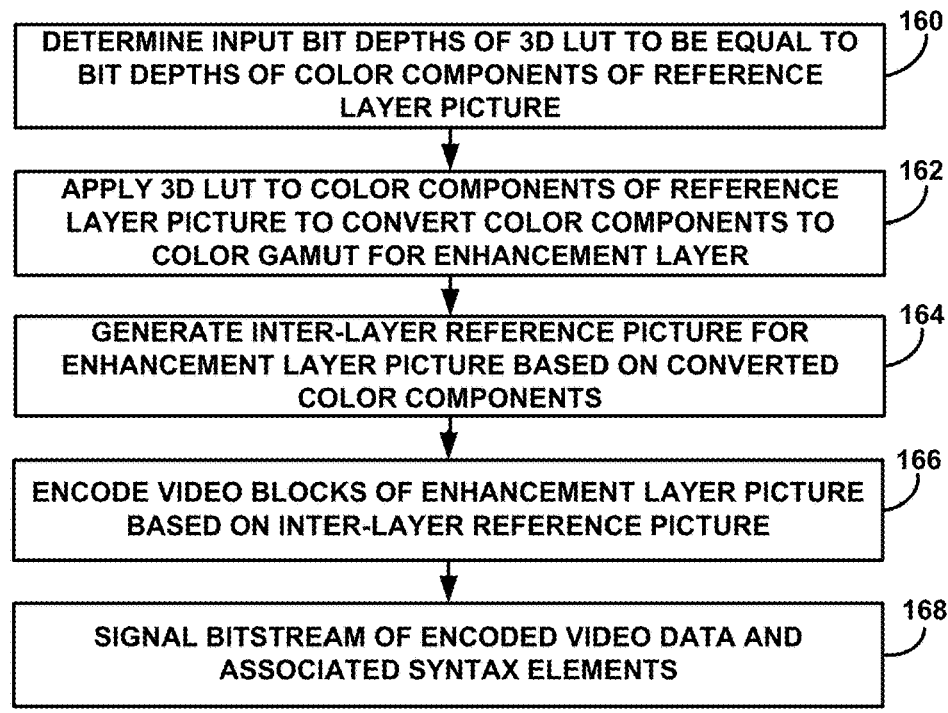
FIG. 15 is a flowchart illustrating an example operation of a video encoder configured to perform 3D color prediction with constrained bit depths of input color components to a 3D lookup table.

FIG. 15 is a flowchart illustrating an example operation of a video encoder configured to perform 3D color prediction with constrained bit depths of input color components to a 3D lookup table. The example operation of FIG. 15 is described herein as being performed by color prediction processing unit 66 of video encoder 20 of FIG. 2. In other examples, the operation may be performed by color prediction processing unit 144 of FIG. 10.

Color prediction processing unit 66 of video encoder 20 may generate a 3D lookup table for color gamut scalability to perform 3D color prediction. The 3D lookup table is signaled in a picture parameter set (PPS) for the video data to be coded, and applies to one or more pictures referenced by the PPS. The PPS may reference one or more enhancement layer pictures in an enhancement layer of the video data, and one or more collocated reference layer pictures in one or more reference layers of the video data. For example, each 3D lookup table may be used to generate inter-layer reference pictures for the enhancement layer pictures included in the enhancement layer based on the collocated reference layer pictures included in the reference layers. The reference layers may comprise base layers and/or lower layers of the video data than the enhancement layer.

According to the techniques of this disclosure, color prediction processing unit 66 determines input bit depths of the 3D lookup table to be equal to bit depths of color components of a reference layer picture in a reference layer of the video data (160). For example, color prediction processing unit 66 may determine a first bit depth for an input luma component of the 3D lookup table that is equal to a bit depth of a luma component of the reference layer picture. Color prediction processing unit 66 may determine a second bit depth for input chroma components of the 3D lookup table that is equal to a bit depth of chroma components of the reference layer picture. In this way, the input bit depth of the 3D lookup table is equal to the bit depth of color components of the reference layer picture, which may be input to the 3D lookup table for conversion to generate an inter-layer reference picture for an enhancement layer picture.

In some examples, color prediction processing unit 66 may also determine output bit depths of the 3D lookup table to be within a range between the bit depths of the color components of the reference layer picture and bit depths of color components of the enhancement layer picture, inclusively. For example, color prediction processing unit 66 may determine a third bit depth for an output luma component of the 3D lookup table that is greater than or equal to a bit depth of a luma component of the reference layer picture and less than or equal to a bit depth of a luma component of the enhancement layer picture, and determine a fourth bit depth for output chroma components of the 3D lookup table that is greater than or equal to a bit depth of chroma components of the reference layer picture and less than or equal to a bit depth of chroma components of the enhancement layer picture. In one example, color prediction processing unit 66 may determine the output bit depths of the 3D lookup table to be equal to the bit depths of the color components of the enhancement layer picture.

Color prediction processing unit 66 then applies the 3D lookup table to the color components of the reference layer picture to convert the color components from a first color gamut for the reference layer of the video data to a second color gamut for the enhancement layer of the video data (162). Converting the color components may include converting the bit depth of the reference layer to the bit depth of the enhancement layer. Color prediction processing unit 66 generates an inter-layer reference picture for the enhancement layer picture in the enhancement layer of the video data based on the converted color components (164).

Video encoder 20 encodes video blocks in the enhancement layer picture based on the inter-layer reference picture generated using the 3D lookup table (166). Video encoder 20 then signals a bitstream of the encoded video data and associated syntax elements (168). For example, according to the techniques of this disclosure, video encoder 20 may signal a first syntax element indicating the first bit depth for the input luma component of the 3D lookup table that is equal to the bit depth of the luma component of the reference layer picture, and signal a second syntax element indicating the second bit depth for the input chroma components of the 3D lookup table that is equal to the bit depth of the chroma components of the reference layer picture. Additionally or alternatively, video encoder 20 may signal a third syntax element indicating the third bit depth for the output luma component of the 3D lookup table that is greater than or equal to the bit depth of the luma component of the reference layer picture and less than or equal to the bit depth of the luma component of the enhancement layer picture, and signal a fourth syntax element indicating the fourth bit depth for the output chroma components of the 3D lookup table that is greater than or equal to the bit depth of the chroma components of the reference layer picture and less than or equal to the bit depth of the chroma components of the enhancement layer picture.

Figure 16:
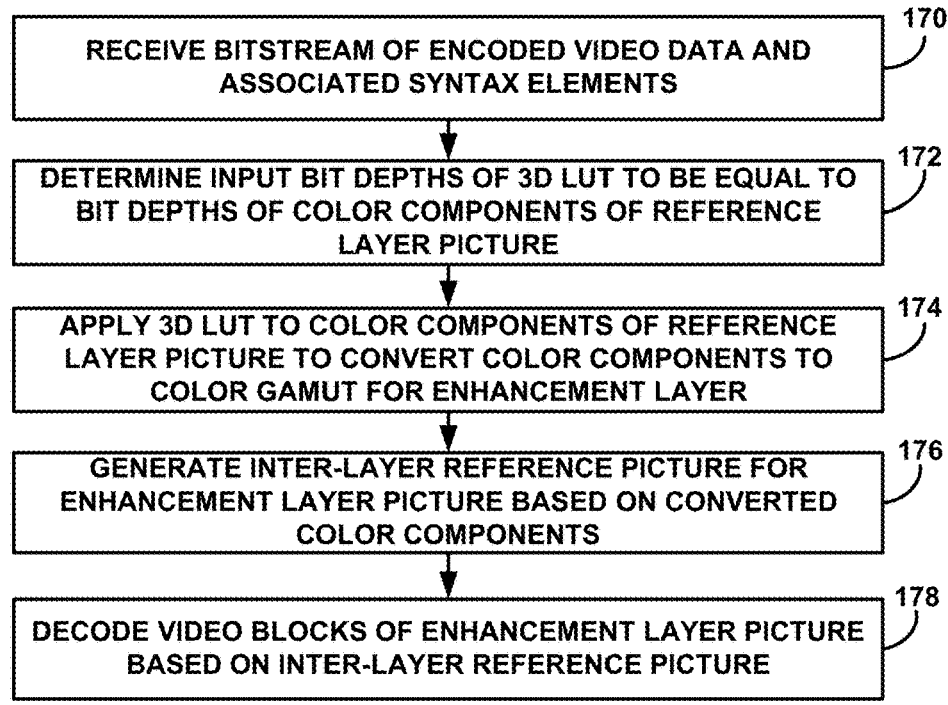
FIG. 16 is a flowchart illustrating an example operation of a video decoder configured to perform 3D color prediction with constrained bit depths of input color components to a 3D lookup table.

FIG. 16 is a flowchart illustrating an example operation of a video decoder configured to perform 3D color prediction with constrained bit depths of input color components to a 3D lookup table. The example operation of FIG. 16 is described herein as being performed by color prediction processing unit 86 of video decoder 30 of FIG. 3. In other examples, the operation may be performed by color prediction processing unit 144 of FIG. 10.

Video decoder 30 receives a bitstream of the encoded video data and associated syntax elements (170). Based on one or more of the syntax elements, color prediction processing unit 86 of video decoder 30 may generate a 3D lookup table for color gamut scalability to perform 3D color prediction. The 3D lookup table may be signaled in a PPS for the video data to be coded, and applies to one or more pictures referenced by the PPS. The PPS may reference one or more enhancement layer pictures in an enhancement layer of the video data, and one or more collocated reference layer pictures in one or more reference layers of the video data. For example, each 3D lookup table may be used to generate inter-layer reference pictures for the enhancement layer pictures included in the enhancement layer based on the collocated reference layer pictures included in the reference layers. The reference layers may comprise base layers and/or lower layers of the video data than the enhancement layer.

According to the techniques of this disclosure, color prediction processing unit 86 determines input bit depths of the 3D lookup table to be equal to bit depths of color components of a reference layer picture in a reference layer of the video data (172). In this way, the input bit depth of the 3D lookup table is equal to the bit depth of color components of the reference layer picture, which may be input to the 3D lookup table for conversion to generate an inter-layer reference picture for an enhancement layer picture.

In one example, color prediction processing unit 86 may receive a first syntax element indicating a first bit depth for an input luma component of the 3D lookup table that is constrained to be equal to a bit depth of a luma component of the reference layer picture, and receive a second syntax element indicating a second bit depth for input chroma components of the 3D lookup table that is constrained to be equal to a bit depth of chroma components of the reference layer picture. In another example, color prediction processing unit 86 may independently derive the first bit depth for the input luma component of the 3D lookup table to be equal to the bit depth of the luma component of the reference layer picture, and independently derive the second bit depth for the input chroma components of the 3D lookup table to be equal to the bit depth of the chroma components of the reference layer picture.

In some examples, color prediction processing unit 86 may also determine output bit depths of the 3D lookup table to be within a range between the bit depths of the color components of the reference layer picture and bit depths of color components of the enhancement layer picture, inclusively. For example, color prediction processing unit 86 may determine the output bit depths of the 3D lookup table to be equal to the bit depths of the color components of the enhancement layer picture.

In one example, color prediction processing unit 86 may receive a third syntax element indicating a third bit depth for an output luma component of the 3D lookup table that is constrained to be greater than or equal to the bit depth of the luma component of the reference layer picture and less than or equal to a bit depth of a luma component of the enhancement layer picture, and receive a fourth syntax element indicating a fourth bit depth for output chroma components of the 3D lookup table that is constrained to be greater than or equal to the bit depth of the chroma components of the reference layer picture and less than or equal to a bit depth of chroma components of the enhancement layer picture. In another example, color prediction processing unit 86 may independently derive the third bit depth for the output luma component of the 3D lookup table to be greater than or equal to the bit depth of the luma component of the reference layer picture and less than or equal to the bit depth of the luma component of the enhancement layer picture, and independently derive the fourth bit depth for the output chroma components of the 3D lookup table to be greater than or equal to the bit depth of the chroma components of the reference layer picture and less than or equal to the bit depth of the chroma components of the enhancement layer picture.

Color prediction processing unit 86 then applies the 3D lookup table to the color components of the reference layer picture to convert the color components from a first color gamut for the reference layer of the video data to a second color gamut for the enhancement layer of the video data (174). Converting the color components may include converting the bit depth of the reference layer to the bit depth of the enhancement layer. Color prediction processing unit 86 generates an inter-layer reference picture for the enhancement layer picture in the enhancement layer of the video data based on the converted color components (176). Video decoder 30 then decodes video blocks in the enhancement layer picture based on the inter-layer reference picture generated using the 3D lookup table (178).

Figure 17:
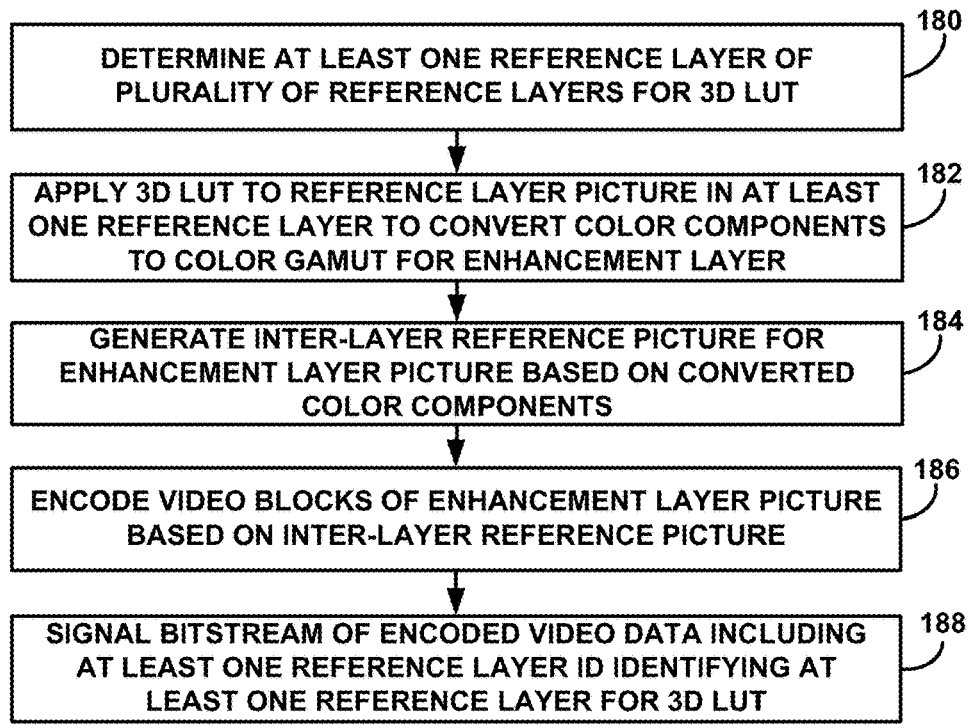
FIG. 17 is a flowchart illustrating an example operation of a video encoder configured to perform 3D color prediction with constrained application only to reference pictures in at least one determined reference layer.

FIG. 17 is a flowchart illustrating an example operation of a video encoder configured to perform 3D color prediction with constrained application only to reference pictures in at least one determined reference layer. The example operation of FIG. 17 is described herein as being performed by color prediction processing unit 66 of video encoder 20 of FIG. 2. In other examples, the operation may be performed by color prediction processing unit 144 of FIG. 10.

Color prediction processing unit 66 of video encoder 20 may generate a 3D lookup table for color gamut scalability to perform 3D color prediction. In an example, the 3D lookup table may be signaled in a PPS for the video data to be coded, and applies to one or more pictures referenced by the PPS. The PPS may reference one or more enhancement layer pictures in an enhancement layer of the video data, and one or more collocated reference layer pictures in one or more reference layers of the video data. The reference layers may comprise base layers and/or lower layers of the video data than the enhancement layer.

In accordance with the techniques of this disclosure, color prediction processing unit 66 determines at least one reference layer of a plurality of reference layers of the video data for the 3D lookup table (180). Color prediction processing unit 66 then applies the 3D lookup table to color components of a reference layer picture in the at least one reference layer to convert the color components from a first color gamut for the reference layer of the video data to a second color gamut for the enhancement layer of the video data (182). Converting the color components may include converting the bit depth of the reference layer to the bit depth of the enhancement layer. Color prediction processing unit 66 generates an inter-layer reference picture for the enhancement layer picture in the enhancement layer of the video data based on the converted color components (184).

Video encoder 20 encodes video blocks in the enhancement layer picture based on the inter-layer reference picture generated using the 3D lookup table (186). Video encoder 20 then signals a bitstream of the encoded video data and associated syntax elements, including at least one reference layer ID identifying the at least one reference layer to which the 3D lookup table is applied (188). In one example, video encoder 20 may signal exactly one reference layer ID identifying exactly one reference layer to which the 3D lookup table is applied for the enhancement layer picture. In this example, color prediction processing unit 66 determines the exactly one reference layer for the 3D lookup table, and applies the 3D lookup table to color components of a reference layer picture in the exactly one reference layer.

In another example, video encoder 20 may signal two or more reference layer IDs identifying two or more reference layers to which the 3D lookup table is applied for the enhancement layer picture. In this example, color prediction processing unit 66 determines the two or more reference layers for the 3D lookup table, applies the 3D lookup table to color components of a reference layer picture in each of the two or more reference layers, and generates the inter-layer reference picture for the enhancement layer picture based on a combination of the converted color components from the two or more reference layers.

In a further example, for a first enhancement layer picture in the enhancement layer, color prediction processing unit 66 may signal a first reference layer ID identifying a first reference layer to which the 3D lookup table is applied to generate a first inter-layer reference picture for the first enhancement layer picture in the enhancement layer. For a second enhancement layer picture in the enhancement layer, which may be a subsequent picture to the first enhancement layer picture in either display order or coding order, color prediction processing unit 66 may signal a second reference layer ID identifying a second reference layer of the plurality of reference layers to which the 3D lookup table is applied to generate a second inter-layer reference picture for the second enhancement layer picture in the enhancement layer, where the second reference layer is different than the first reference layer.

Figure 18:
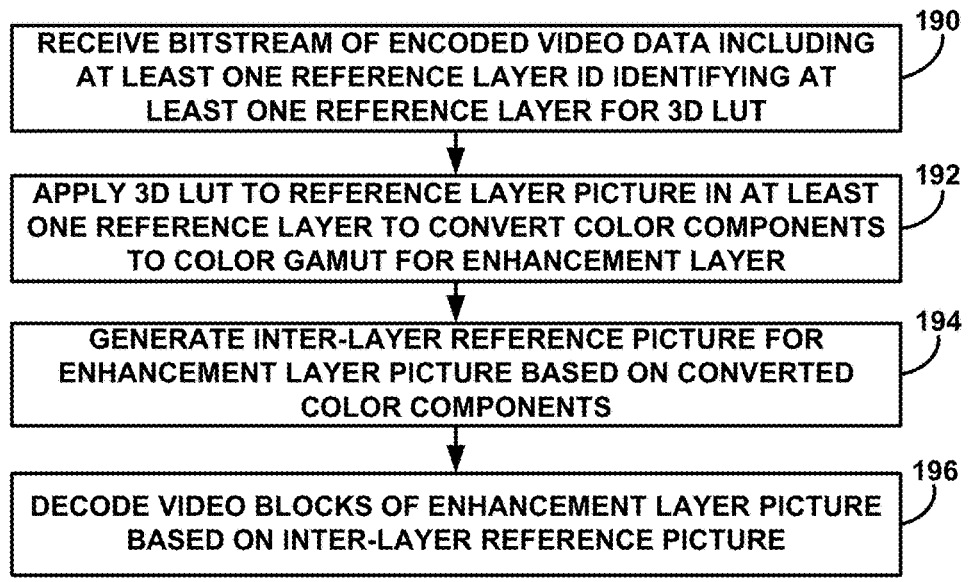
FIG. 18 is a flowchart illustrating an example operation of a video decoder configured to perform 3D color prediction with constrained application only to reference pictures in at least one identified reference layer.

FIG. 18 is a flowchart illustrating an example operation of a video decoder configured to perform 3D color prediction with constrained application only to reference pictures in at least one identified reference layer. The example operation of FIG. 18 is described herein as being performed by color prediction processing unit 86 of video decoder 30 of FIG. 3. In other examples, the operation may be performed by color prediction processing unit 144 of FIG. 10.

Video decoder 30 receives a bitstream of the encoded video data and associated syntax elements, including at least one reference layer ID identifying at least one reference layer of a plurality of reference layers for a 3D lookup table (190). Based on one or more of the syntax elements, color prediction processing unit 86 of video decoder 30 may generate a 3D lookup table for color gamut scalability to perform 3D color prediction. The 3D lookup table may be signaled in a PPS for the video data to be coded, and applied to one or more pictures referenced by the PPS. The PPS may reference one or more enhancement layer pictures in an enhancement layer of the video data, and one or more collocated reference layer pictures in one or more reference layers of the video data. The reference layers may comprise base layers and/or lower layers of the video data than the enhancement layer.

In accordance with the techniques of this disclosure, the at least one reference layer ID for the 3D lookup table received in the bitstream identifies at least one of the reference layers of the video data to which the 3D lookup table is applied to generate an inter-layer reference picture for a given enhancement layer picture included in the enhancement layer. Color prediction processing unit 86 then applies the 3D lookup table to color components of a reference layer picture in the at least one reference layer identified by the at least one reference layer ID to convert the color components from a first color gamut for the reference layer of the video data to a second color gamut for the enhancement layer of the video data (192). Converting the color components may include converting the bit depth of the reference layer to the bit depth of the enhancement layer. Color prediction processing unit 86 generates an inter-layer reference picture for the enhancement layer picture in the enhancement layer of the video data based on the converted color components (194). Video decoder 30 then decodes video blocks in the enhancement layer picture based on the inter-layer reference picture generated using the 3D lookup table (196).

In one example, color prediction processing unit 86 of video decoder 30 may receive exactly one reference layer ID identifying exactly one reference layer to which the 3D lookup table is applied for the enhancement layer picture. In this example, color prediction processing unit 86 then applies the 3D lookup table to color components of a reference layer picture in the exactly one reference layer identified by the exactly one reference layer ID.

In another example, color prediction processing unit 86 of video decoder 30 may receive two or more reference layer IDs identifying two or more reference layers to which the 3D lookup table is applied for the enhancement layer picture. In this example, color prediction processing unit 86 then applies the 3D lookup table to color components of a reference layer picture in each of the two or more reference layers identified by the two or more reference layer IDs, and generates the inter-layer reference picture for the enhancement layer picture based on a combination of the converted color components from the two or more reference layers.

In a further example, for a first enhancement layer picture in the enhancement layer, color prediction processing unit 86 may receive a first reference layer ID identifying a first reference layer to which the 3D lookup table is applied to generate a first inter-layer reference picture for the first enhancement layer picture in the enhancement layer. For a second enhancement layer picture in the enhancement layer, which may be a subsequent picture to the first enhancement layer picture in either display order or coding order, color prediction processing unit 86 may receive a second reference layer ID identifying a second reference layer of the plurality of reference layers to which the 3D lookup table is applied to generate a second inter-layer reference picture for the second enhancement layer picture in the enhancement layer, where the second reference layer is different than the first reference layer.

Certain aspects of this disclosure have been described with respect to the HEVC standard for purposes of illustration. However, the techniques described in this disclosure may be useful for other video coding processes, including other standard or proprietary video coding processes not yet developed.

A video coder, as described in this disclosure, may refer to a video encoder or a video decoder. Similarly, a video coding unit may refer to a video encoder or a video decoder. Likewise, video coding may refer to video encoding or video decoding, as applicable.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
    receiving at least one reference layer identifier (ID) for a three-dimensional (3D) lookup table for color gamut scalability, wherein the 3D lookup table is defined for an enhancement layer of the video data, and wherein the at least one reference layer ID identifies at least one reference layer of a plurality of reference layers of the video data to which the 3D lookup table is to be applied;
    applying the 3D lookup table to color components of a reference layer picture in the at least one reference layer identified by the at least one reference layer ID to convert the color components from a first color gamut for the reference layers of the video data to a second color gamut for the enhancement layer of the video data;
    generating an inter-layer reference picture for an enhancement layer picture in the enhancement layer of the video data based on the converted color components; and
    decoding video blocks of the enhancement layer picture based on the inter-layer reference picture generated using the 3D lookup table.

2. The method of claim 1, wherein receiving the at least one reference layer ID for the 3D lookup table comprises receiving exactly one reference layer ID identifying exactly one reference layer to which the 3D lookup table is to be applied.

3. The method of claim 2, wherein applying the 3D lookup table comprises applying the 3D lookup table to color components of a reference layer picture in the exactly one reference layer identified by the exactly one reference layer ID.

4. The method of claim 1, wherein receiving the at least one reference layer ID for the 3D lookup table comprises receiving two or more reference layer IDs identifying two or more reference layers to which the 3D lookup table is to be applied.

5. The method of claim 4,
    wherein applying the 3D lookup table comprises applying the 3D lookup table to color components of a reference layer picture in each of the two or more reference layers identified by the two or more reference layer IDs to convert the color components of the reference layer pictures of the two or more reference layers;
    wherein generating the inter-layer reference picture comprises generating the inter-layer reference picture based on a combination of the converted color components from the two or more reference layers.

6. The method of claim 1, wherein receiving the at least one reference layer ID comprises receiving a first reference layer ID identifying a first reference layer having first color components of a first reference layer picture to which the 3D lookup table is applied to generate a first inter-layer reference picture for a first enhancement layer picture in the enhancement layer, the method further comprising:
    receiving a second reference layer ID identifying a second reference layer of the plurality of reference layers of the video data, the second reference layer being different than the first reference layer;
    applying the 3D lookup table to second color components of a second reference layer picture in the second reference layer to convert the second color components of the second reference layer picture of the second reference layer;
    generating a second inter-layer reference picture for a second enhancement layer picture in the enhancement layer of the video data based on the converted color components, the second enhancement layer picture being different than the first enhancement layer picture; and
    decoding video blocks of the second enhancement layer picture based on the second inter-layer reference picture generated using the 3D lookup table.

7. A method of encoding video data, the method comprising:
    determining at least one reference layer of a plurality of reference layers of the video data for a three-dimensional (3D) lookup table for color gamut scalability, wherein the 3D lookup table is defined for an enhancement layer of the video data;
    applying the 3D lookup table to color components of a reference layer picture in the at least one reference layer to convert the color components from a first color gamut for the reference layers of the video data to a second color gamut for the enhancement layer of the video data;
    generating an inter-layer reference picture for an enhancement layer picture in the enhancement layer of the video data based on the converted second color components;
    encoding video blocks of the enhancement layer picture based on the inter-layer reference picture generated using the 3D lookup table; and
    signaling at least one reference layer identifier (ID) identifying the at least one reference layer of the plurality of reference layers of the video data to which the 3D lookup table is applied.

8. The method of claim 7, wherein signaling the at least one reference layer ID comprises signaling exactly one reference layer ID identifying exactly one reference layer to which the 3D lookup table is applied.

9. The method of claim 8,
    wherein determining the at least one reference layer comprises determining the exactly one reference layer for the 3D lookup table; and
    wherein applying the 3D lookup table comprises applying the 3D lookup table to color components of a reference layer picture in the exactly one reference layer.

10. The method of claim 7, wherein signaling the at least one reference layer ID comprises signaling two or more reference layer IDs identifying two or more reference layers to which the 3D lookup table is applied.

11. The method of claim 10,
    wherein determining the at least one reference layer comprises determining the two or more reference layers for the 3D lookup table;
    wherein applying the 3D lookup table comprises applying the 3D lookup table to color components of a reference layer picture in each of the two or more reference layers to convert the color components of the reference layer pictures of the two or more reference layers; and
    wherein generating the inter-layer reference picture comprises generating the inter-layer reference picture based on a combination of the converted color components from the two or more reference layers.

12. The method of claim 7, wherein signaling the at least one reference layer ID comprises signaling a first reference layer ID identifying a first reference layer having first color components of a first reference layer picture to which the 3D lookup table is applied to generate a first inter-layer reference picture for a first enhancement layer picture in the enhancement layer, the method further comprising:
  determining a second reference layer ID identifying a second reference layer of the plurality of reference layers of the video data, the second reference layer being different than the first reference layer;
  applying the 3D lookup table to second color components of a second reference layer picture in the second reference layer to convert the second color components of the second reference layer picture of the second reference layer;
  generating a second inter-layer reference picture for a second enhancement layer picture in the enhancement layer of the video data based on the converted second color components, the second enhancement layer picture being different than the first enhancement layer picture;
  encoding video blocks of the second enhancement layer picture based on the second inter-layer reference picture generated using the 3D lookup table; and
  signaling the second reference layer ID identifying the second reference layer of the plurality of reference layers of the video data to which the 3D lookup table is applied.

13. A video decoding device comprising:
a memory configured to store video data; and
one or more processors in communication with the memory and configured to:
  receive at least one reference layer identifier (ID) for a three-dimensional (3D) lookup table for color gamut scalability, wherein the 3D lookup table is defined for an enhancement layer of the video data, and wherein the at least one reference layer ID identifies at least one reference layer of a plurality of reference layers of the video data to which the 3D lookup table is to be applied;
  apply the 3D lookup table to color components of a reference layer picture in the at least one reference layer identified by the at least one reference layer ID to convert the color components from a first color gamut for the reference layers of the video data to a second color gamut for the enhancement layer of the video data;
  generate an inter-layer reference picture for an enhancement layer picture in the enhancement layer of the video data based on the converted color components; and
  decode video blocks of the enhancement layer picture based on the inter-layer reference picture generated using the 3D lookup table.

14. The device of claim 13, wherein the one or more processors are configured to receive exactly one reference layer ID identifying exactly one reference layer to which the 3D lookup table is to be applied.

15. The device of claim 14, the one or more processors are configured to apply the 3D lookup table to color components of a reference layer picture in the exactly one reference layer identified by the exactly one reference layer ID.

16. The device of claim 13, wherein the one or more processors are configured to receive two or more reference layer IDs identifying two or more reference layers to which the 3D lookup table is to be applied.

17. The device of claim 16, wherein the one or more processors are configured to:
  apply the 3D lookup table to color components of a reference layer picture in each of the two or more reference layers identified by the two or more reference layer IDs to convert the color components of the reference layer pictures of the two or more reference layers; and
  generate the inter-layer reference picture based on a combination of the converted color components from the two or more reference layers.

18. The device of claim 13, wherein the one or more processors are configured to:
  receive a first reference layer ID identifying a first reference layer of the plurality of reference layers having first color components of a first reference layer picture to which the 3D lookup table is applied to generate a first inter-layer reference picture for a first enhancement layer picture in the enhancement layer;
  receive a second reference layer ID identifying a second reference layer of the plurality of reference layers of the video data, the second reference layer being different than the first reference layer;
  apply the 3D lookup table to second color components of a second reference layer picture in the second reference layer to convert the second color components of the second reference layer picture of the second reference layer;
  generate a second inter-layer reference picture for a second enhancement layer picture in the enhancement layer of the video data based on the converted second color components, the second enhancement layer picture being different than the first enhancement layer picture; and
  decode video blocks of the second enhancement layer picture based on the second inter-layer reference picture generated using the 3D lookup table.

19. A video encoding device comprising:
a memory configured to store video data; and
one or more processors in communication with the memory and configured to:
  determine at least one reference layer of a plurality of reference layers of the video data for a three-dimensional (3D) lookup table for color gamut scalability, wherein the 3D lookup table is defined for an enhancement layer of the video data;
  apply the 3D lookup table to color components of a reference layer picture in the at least one reference layer to convert the color components from a first color gamut for the reference layers of the video data to a second color gamut for the enhancement layer of the video data;
  generate an inter-layer reference picture for an enhancement layer picture in the enhancement layer of the video data based on the converted color components;
  encode video blocks of the enhancement layer picture based on the inter-layer reference picture generated using the 3D lookup table; and
  signal at least one reference layer identifier (ID) identifying the at least one reference layer of the plurality of reference layers of the video data to which the 3D lookup table is applied.

20. The device of claim 19, wherein the one or more processors are configured to signal exactly one reference layer ID identifying exactly one reference layer to which the 3D lookup table is applied.

21. The device of claim 20, wherein the one or more processors are configured to:
  determine the exactly one reference layer for the 3D lookup table; and
  apply the 3D lookup table to color components of a reference layer picture in the exactly one reference layer.

22. The device of claim 19, wherein the one or more processors are configured to signal two or more reference layer IDs identifying two or more reference layers to which the 3D lookup table is applied.

23. The device of claim 22, wherein the one or more processors are configured to:
  determine the two or more reference layers for the 3D lookup table;
  apply the 3D lookup table to color components of a reference layer picture in each of the two or more reference layers to convert the color components of the reference layer pictures of the two or more reference layers; and
  generate the inter-layer reference picture based on a combination of the converted color components from the two or more reference layers.

24. The device of claim 19, wherein the one or more processors are configured to:
  signal a first reference layer ID identifying a first reference layer of the plurality of reference layers having first color components of a first reference layer picture to which the 3D lookup table is applied to generate a first inter-layer reference picture for a first enhancement layer picture in the enhancement layer;
  determine a second reference layer ID identifying a second reference layer of the plurality of reference layers of the video data, the second reference layer being different than the first reference layer;
  apply the 3D lookup table to second color components of a second reference layer picture in the second reference layer to convert the second color components of the second reference layer picture of the second reference layer;
  generate a second inter-layer reference picture for a second enhancement layer picture in the enhancement layer of the video data based on the converted second color components, the second enhancement layer picture being different than the first enhancement layer picture;
  encode video blocks of the second enhancement layer picture based on the second inter-layer reference picture generated using the 3D lookup table; and
  signal the second reference layer ID identifying the second reference layer of the plurality of reference layers of the video data to which the 3D lookup table is applied.

25. A video decoding device comprising:
  means for receiving at least one reference layer identifier (ID) for a three-dimensional (3D) lookup table for color gamut scalability, wherein the 3D lookup table is defined for an enhancement layer of the video data, and wherein the at least one reference layer ID identifies at least one reference layer of a plurality of reference layers of the video data to which the 3D lookup table is to be applied;
  means for applying the 3D lookup table to color components of a reference layer picture in the at least one reference layer identified by the at least one reference layer ID to convert the color components from a first color gamut for the reference layers of the video data to a second color gamut for the enhancement layer of the video data;
  means for generating an inter-layer reference picture for an enhancement layer picture in the enhancement layer of the video data based on the converted color components; and
  means for decoding video blocks of the enhancement layer picture based on the inter-layer reference picture generated using the 3D lookup table.

26. A non-transitory computer-readable storage medium storing instructions for decoding video data that, when executed, cause one or more processors to:
  receive at least one reference layer identifier (ID) for a three-dimensional (3D) lookup table for color gamut scalability, wherein the 3D lookup table is defined for an enhancement layer of the video data, and wherein the at least one reference layer ID identifies at least one reference layer of a plurality of reference layers of the video data to which the 3D lookup table is to be applied;
  apply the 3D lookup table to color components of a reference layer picture in the at least one reference layer identified by the at least one reference layer ID to convert the color components from a first color gamut for the reference layers of the video data to a second color gamut for the enhancement layer of the video data;
  generate an inter-layer reference picture for an enhancement layer picture in the enhancement layer of the video data based on the converted color components; and
  decode video blocks of the enhancement layer picture based on the inter-layer reference picture generated using the 3D lookup table.

* * * * *